US012621669B2

(12) United States Patent
Manolakos et al.

(10) Patent No.: US 12,621,669 B2
(45) Date of Patent: May 5, 2026

(54) PARTIAL POSITION SIGNALING FOR PREVENTING NEW RADIO POSITIONING ATTACKS

(71) Applicant: QUALCOMM Incorporated, San Diego, CA (US)

(72) Inventors: Alexandros Manolakos, Escondido, CA (US); Weimin Duan, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 304 days.

(21) Appl. No.: 18/548,010

(22) PCT Filed: Apr. 15, 2022

(86) PCT No.: PCT/US2022/025135
§ 371 (c)(1),
(2) Date: Aug. 25, 2023

(87) PCT Pub. No.: WO2022/250807
PCT Pub. Date: Dec. 1, 2022

(65) Prior Publication Data
US 2024/0147239 A1 May 2, 2024

(30) Foreign Application Priority Data

May 27, 2021 (GR) ............................... 20210100353

(51) Int. Cl.
*H04W 12/122* (2021.01)
*H04L 5/00* (2006.01)
(Continued)

(52) U.S. Cl.
CPC ......... *H04W 12/122* (2021.01); *H04L 5/0048* (2013.01); *H04W 12/104* (2021.01); *H04W 64/00* (2013.01)

(58) Field of Classification Search
CPC . H04W 12/122; H04W 12/104; H04W 64/00; H04W 12/79; H04W 4/029;
(Continued)

(56) References Cited

U.S. PATENT DOCUMENTS

2019/0319827 A1* 10/2019 Opshaug ............... H04L 5/0053
2021/0099885 A1 4/2021 Tsai et al.
(Continued)

OTHER PUBLICATIONS

International Search Report and Written Opinion—PCT/US2022/025135—ISA/EPO—Aug. 4, 2022.

*Primary Examiner* — Benjamin M Thieu
(74) *Attorney, Agent, or Firm* — Polsinelli

(57) ABSTRACT

Disclosed are systems, methods, and non-transitory media for detecting a positioning attack based on wireless position signaling. For example, a location server can determine a positioning reference signal having at least a first signal portion and at least a second signal portion. An indication of a positioning attack associated with the positioning reference signal can be obtained. The location server can provide, to a base station, a message of transmission preemption of the second signal portion of the positioning reference signal based on the indication of the positioning attack.

30 Claims, 13 Drawing Sheets

1000

Determine A Positioning Reference Signal Having At Least A First Signal Portion And At Least A Second Signal Portion
1002

Transmit The First Signal Portion Of The Positioning Reference Signal To A Plurality Of User Equipment (UE) Devices
1004

Obtaining An Indication Of Transmission Preemption Of The Second Signal Portion Of The Positioning Reference Signal, Wherein The Plurality Of UE Devices Are Configured To Process The First Signal Portion And The Second Signal Portion
1006

(51) Int. Cl.
*H04W 12/104*          (2021.01)
*H04W 64/00*          (2009.01)

(58) Field of Classification Search
CPC . H04L 5/0048; H04L 63/162; H04L 63/1466;
H04L 2209/80; H04L 2463/146
See application file for complete search history.

(56)                    References Cited

U.S. PATENT DOCUMENTS

| | | | |
|---|---|---|---|
| 2021/0152410 A1 | 5/2021 | Opshaug et al. | |
| 2021/0329585 A1* | 10/2021 | Mamlet | H04B 17/318 |
| 2022/0256350 A1* | 8/2022 | Bernsen | G01S 13/876 |
| 2022/0353718 A1* | 11/2022 | Duan | H04W 24/10 |

* cited by examiner

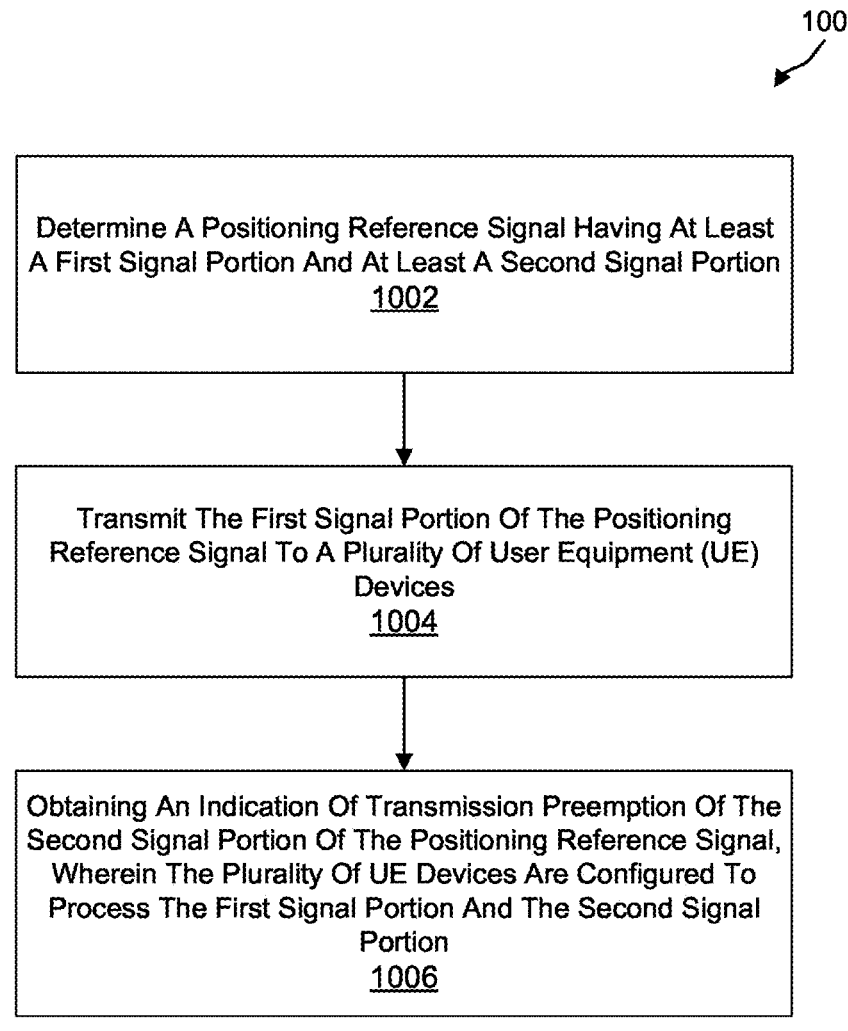

1000

Determine A Positioning Reference Signal Having At Least A First Signal Portion And At Least A Second Signal Portion
1002

Transmit The First Signal Portion Of The Positioning Reference Signal To A Plurality Of User Equipment (UE) Devices
1004

Obtaining An Indication Of Transmission Preemption Of The Second Signal Portion Of The Positioning Reference Signal, Wherein The Plurality Of UE Devices Are Configured To Process The First Signal Portion And The Second Signal Portion
1006

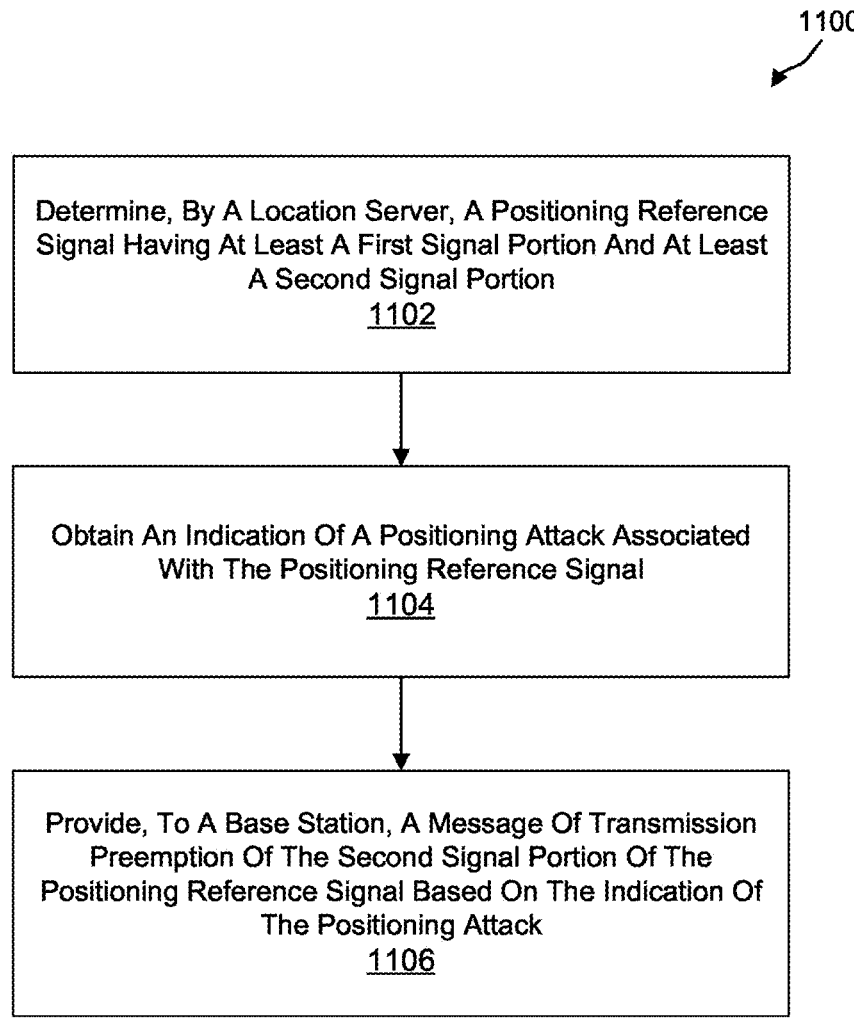

Determine, By A Location Server, A Positioning Reference Signal Having At Least A First Signal Portion And At Least A Second Signal Portion
1102

Obtain An Indication Of A Positioning Attack Associated With The Positioning Reference Signal
1104

Provide, To A Base Station, A Message Of Transmission Preemption Of The Second Signal Portion Of The Positioning Reference Signal Based On The Indication Of The Positioning Attack
1106

FIG. 11

PARTIAL POSITION SIGNALING FOR PREVENTING NEW RADIO POSITIONING ATTACKS

FIELD OF THE DISCLOSURE

Aspects of the disclosure relate generally to positioning signaling. In some implementations, examples are described for providing partial position signaling to prevent and/or detect positioning attacks.

BACKGROUND OF THE DISCLOSURE

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users with, for example, a gigabit connection speeds to tens of users in a common location, such as on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, apparatuses, methods, and computer-readable media for detecting and/or preventing a positioning attack. According to at least one example, a computer-implemented method of detecting a positioning attack is provided. The computer-implemented method comprises: determining, by a location server, a positioning reference signal having at least a first signal portion and at least a second signal portion; obtaining an indication of a positioning attack associated with the positioning reference signal; and providing, to a base station, a message of transmission preemption of the second signal portion of the positioning reference signal based on the indication of the positioning attack.

In another example, an apparatus for detecting a positioning attack is provided, the apparatus including at least one transceiver, at least one memory, and at least one processor coupled to the at least one transceiver and the at least one memory and configured to: determine a positioning reference signal having at least a first signal portion and at least a second signal portion; obtain an indication of a positioning attack associated with the positioning reference signal; and provide a message of transmission preemption of the second signal portion of the positioning reference signal based on the indication of the positioning attack.

In another example, a non-transitory computer-readable storage medium is provided comprising at least one instruction for causing a computer or processor to: determine a positioning reference signal having at least a first signal portion and at least a second signal portion; obtain an indication of a positioning attack associated with the positioning reference signal; and provide a message of transmission preemption of the second signal portion of the positioning reference signal based on the indication of the positioning attack.

In another example, an apparatus is provided for detecting a positioning attack, the apparatus comprising: means for determining a positioning reference signal having at least a first signal portion and at least a second signal portion; means for obtaining an indication of a positioning attack associated with the positioning reference signal; and means for providing a message of transmission preemption of the second signal portion of the positioning reference signal based on the indication of the positioning attack.

In another example, a computer-implemented method for detecting a positioning attack is provided. The computer-implemented method comprises: determining a positioning reference signal having at least a first signal portion and at least a second signal portion; transmitting the first signal portion of the positioning reference signal to a plurality of user equipment (UE) devices; and obtaining an indication of transmission preemption of the second signal portion of the positioning reference signal, wherein the plurality of UE devices are configured to process the first signal portion and the second signal portion.

In another example, an apparatus for detecting a positioning attack is provided, the apparatus including at least one transceiver, at least one memory, and at least one processor coupled to the at least one transceiver and the at least one memory and configured to: determine a positioning reference signal having at least a first signal portion and at least a second signal portion; transmit, via the at least one transceiver, the first signal portion of the positioning reference signal to a plurality of user equipment (UE) devices; and obtain an indication of transmission preemption of the second signal portion of the positioning reference signal, wherein the plurality of UE devices are configured to process the first signal portion and the second signal portion.

In another example, a non-transitory computer-readable storage medium is provided comprising at least one instruction for causing a computer or processor to: determine a positioning reference signal having at least a first signal portion and at least a second signal portion; transmit the first signal portion of the positioning reference signal to a plurality of user equipment (UE) devices; and obtain an indication of transmission preemption of the second signal portion of the positioning reference signal, wherein the plurality of UE devices are configured to process the first signal portion and the second signal portion.

In another example, an apparatus is provided for detecting a positioning attack, the apparatus comprising: means for determining a positioning reference signal having at least a first signal portion and at least a second signal portion; means for transmitting the first signal portion of the positioning reference signal to a plurality of user equipment (UE) devices; and means for obtaining an indication of transmission preemption of the second signal portion of the positioning reference signal, wherein the plurality of UE devices are configured to process the first signal portion and the second signal portion.

In some aspects, the apparatus is or is part of a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a vehicle, a server computer, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors, which can be used for determining a location of the apparatuses, a state of the apparatuses (e.g., a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 10 illustrates an example flow diagram of a process for performing partial position signaling for detecting and/or preventing new radio positioning attacks, in accordance with some aspects of the present disclosure;

FIG. 11 illustrates another example flow diagram of a process for performing partial signaling for detecting and/or preventing new radio positioning attacks, in accordance with some aspects of the present disclosure.

DETAILED DESCRIPTION

Figure 1:
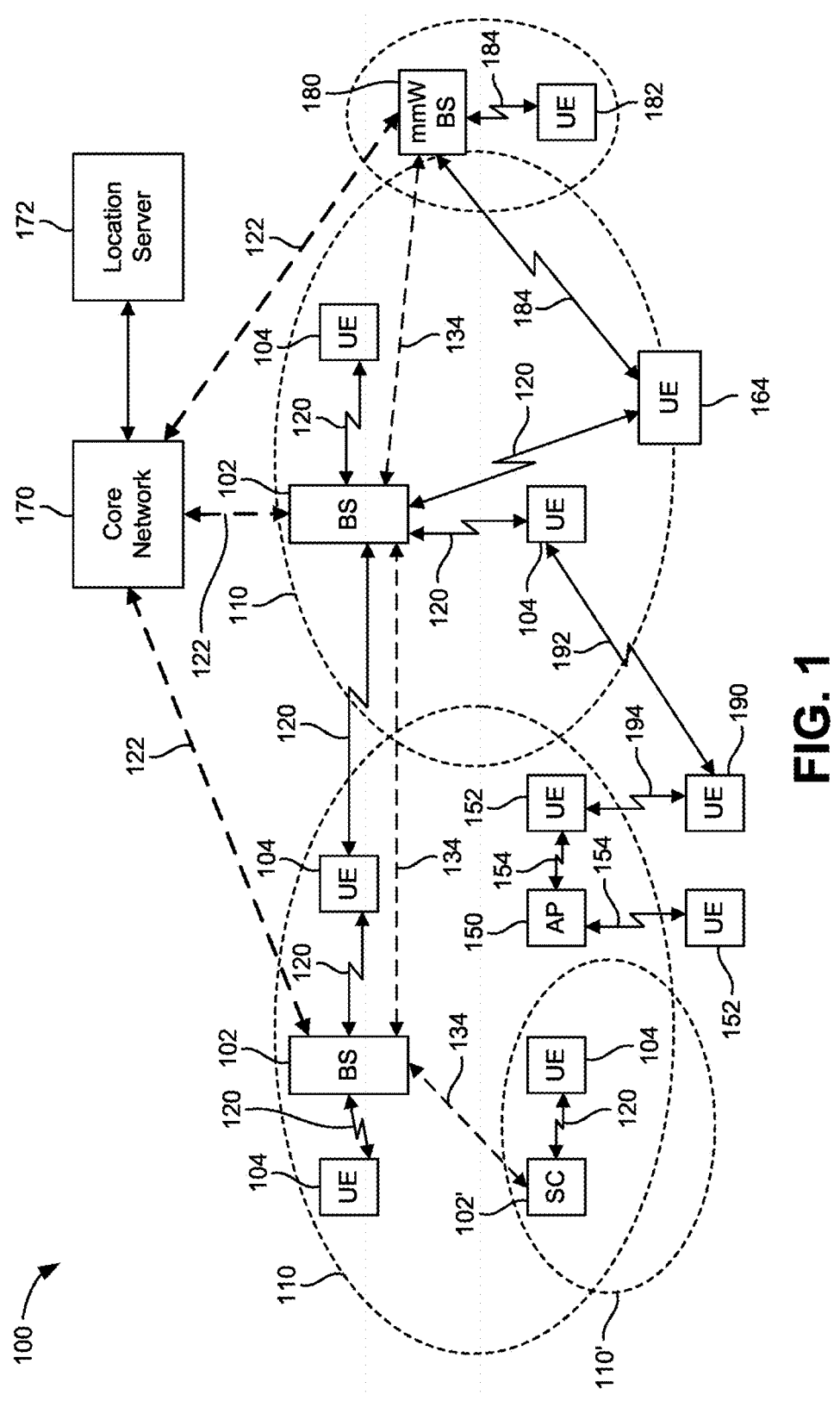
FIG. 1 illustrates an example wireless communications system, in accordance with some aspects of the present disclosure.

Certain aspects and embodiments of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects and embodiments described herein may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Wireless communication networks are deployed to provide various communication services, such as voice, video, packet data, messaging, broadcast, and the like. A wireless communication network may also provide location related services for wireless devices that are associated with the network. Location related services provided by a wireless network can be used for a great variety of applications that can include indoor positioning, automotive applications (e.g., vehicular to everything "V2X" applications), autonomous vehicles, drone control and/or localization, emergency services, etc.

In some examples, location related services are based on radio frequency (RF) signals that are transmitted and received between two or more nodes. For example, and as described further herein, a base station can transmit a positioning reference signal (PRS) to one or more wireless devices. A wireless device can measure different parameters associated with the PRS and report the measurements to a location server. Based on the measurements, the location server can determine the location of the wireless device.

In some instances, an attacker (e.g., a hacker) may attempt to disrupt location related services provided by a wireless network. In some cases, an attacker may monitor the PRS signal transmitted by a base station and utilize one or more algorithms to launch an attack on the PRS signal. For example, an attacker may monitor a first portion of the PRS signal and transmit an unauthorized signal that is intended to interfere with a second portion of the PRS signal.

In some instances, a wireless device that is within range of the unauthorized signal that is transmitted by the attacker will receive the unauthorized signal and mistakenly interpret it as the PRS from the base station. In some cases, the wireless device may report measurements that are based on the unauthorized signal, which will yield an incorrect location for the wireless device. Such a positioning attack can be used by an attacker to misappropriate applications that rely on the location of the wireless device. As further discussed herein, a base station and/or location server may utilize techniques to inhibit transmission of portions of the PRS signal in order to prevent and/or detect these types of positioning attacks.

Systems, apparatuses, processes (also referred to as methods), and computer-readable media (collectively referred to herein as systems and techniques) are described herein for performing partial position signaling in order to prevent and/or detect positioning attacks. As described in more detail below, the systems and techniques can inhibit (e.g., puncture, preempt, stop, zero-out, mute, pause, etc.) transmission of one or more portions of a positioning reference signal (PRS).

In some aspects, a base station and/or a location server (e.g., location management function) can determine a PRS having a first signal portion and a second signal portion. The base station can transmit the first signal portion of the PRS to a plurality of user equipment (UE) devices (also referred to as UEs). In some examples, the base station can inhibit transmission of the second signal portion of the PRS to the plurality of UEs. In some cases, the plurality of UEs are configured to receive and process the entire PRS (e.g., the first portion of the PRS and the second portion of the PRS). Consequently, the plurality of UEs will continue to take and report measurements corresponding to the second portion of the PRS that was inhibited.

In some examples, transmitting the first portion of the PRS and inhibiting the second portion of the PRS can be used to identify and/or prevent a positioning attack. For example, an attacker may process the first portion of the PRS to configure an unauthorized signal that is intended to interfere with the second portion of the PRS. In some cases, the attacker will transmit the unauthorized signal using transmission resources (e.g., frequency sub-bands, resource elements, beams, symbols, etc.) that would correspond to the second portion of the PRS. In some aspects, the unauthorized signal that is transmitted while the second portion of the PRS is inhibited will be processed by one or more UEs that are in range of the unauthorized signal. In some examples, the one or more UEs that are in range of the unauthorized signal will report measurements that correspond to the unauthorized signal and that can be used by the base station and/or location server to identify the source of the positioning attack.

In some cases, transmission of a partial PRS (e.g., inhibiting portion of PRS) may be performed periodically or on a pseudo-random basis. In some examples, periodic or random transmission of a partial PRS can be used to proactively identify or prevent positioning attacks. In some cases, transmission of a partial PRS can be performed dynamically (e.g., on demand), such as when the base station and/or location server detect a possible positioning attack. In some examples, one or more UEs may send an indication to the server of a potential positioning attack. For instance, one or more UEs may detect an attack based on one or more irregularities associated with the PRS measurements. In some cases, a UE may detect a positioning attack based on a change in downlink reference signal power (DL RSRP), downlink reference signal time difference (DL RSTD), downlink time difference of arrival (DL-TDOA), downlink angle of departure (DL-AoD), any other signal parameter, and/or any combination thereof.

In some aspects, a UE may send one or more of the signal measurements to a location server for processing. In some examples, a location server may collect signal measurements from a plurality of UEs (e.g., crowdsource measurement data) corresponding to one or more transmission-reception points. In some cases, the server may process the data received from the plurality of UEs to detect a positioning based attack. In some examples, the location server may use machine learning algorithms, artificial intelligence, and/or any other suitable algorithm to process measurements received from UEs and detect a positioning attack. In some aspects, a location server may determine one or more metrics associated with a positioning attack. In some examples, metrics associated with a positioning attack can include a probability of a positioning attack (e.g., based on data received from one or more UEs), a security metric (e.g., based on type of TX sequence, encryption type, etc.), an integrity metric (e.g., based on statistical analysis of UE measurements to identify outliers or anomalies), a resilience metric (e.g., based on the number and/or periodicity of PRS resources), any other metric, and/or any combination thereof. In some examples, the location server may implement partial PRS transmission in response to determining that a metric associated with a positioning attack (e.g., the probability of a positioning attack) meets or exceeds a particular threshold.

In some cases, the location server can configure the first portion of the PRS and the second portion of the PRS to correspond to one or more transmission resources. In some aspects, the first signal portion and the second signal portion can correspond to different portions of the same slot. In some examples, the first signal portion and the second signal portion can correspond to different portions of the same symbol. In some cases, the first signal portion and the second signal portion can correspond to different sub-bands within the bandwidth of the PRS. In some aspects, the first signal portion and the second signal portion can correspond to different repetitions of a PRS resource. In some examples, the first signal portion and the second signal portion can correspond to different instances within multiple instances of a PRS resource. In some cases, the first signal portion and the second signal portion can correspond to a first PRS beam and a second PRS beam within multiple beams of a set. In some aspects, the first signal portion and the second signal portion can correspond to a first PRS beam and a second PRS beam within multiple beams of a transmission-reception point (TRP).

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A base station may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). As used herein the term traffic channel (TCH) can refer to either an uplink, reverse or downlink, and/or a forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

A radio frequency signal or "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Various aspects of the techniques described herein will be discussed below with respect to the figures. According to various aspects, FIG. 1 illustrates an example of a wireless communications system 100. The wireless communications system 100 (which may also be referred to as a wireless wide area network (WWAN)) may include various base stations 102 and various user equipment devices (UEs) 104. As used herein, the term "UE" may be referred to interchangeably as an "access terminal" or "AT," a "user device," a "user terminal" or UT, a "client device," a "wireless device," a "subscriber device," a "subscriber terminal," a "subscriber station," a "mobile device," a "mobile terminal," a "mobile station," or variations thereof.

The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to a 4G/LTE network, or gNBs where the wireless communications system 100 corresponds to a 5G/NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In some aspects, the base stations 102 may be configured by location server 172 to transmit one or more positioning reference signals (PRS) to UEs 104. The UEs 104 can measure different parameters associated with each PRS and report the measurements to location server 172 via base station 102. Location sever can use location measurements associated with each PRS to determine a location of UEs 104 and provide location based services.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 (e.g., access links) between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs etc.) that communicate with one or more UEs 104, base stations 102, APs 150, etc. utilizing the ultra-wideband (UWB) spectrum. The UWB spectrum can range from 3.1 to 10.5 GHz.

The small cell base station 102' may operate in a licensed and/or an unlicensed frequency spectrum (e.g., utilizing LTE or NR technology and use the same 5 GHz unlicensed frequency spectrum as used by the WLAN AP 150). The wireless communications system 100 may further include a millimeter wave (mmW) base station 180 that may operate in mmW frequencies and/or near mmW frequencies in communication with a UE 182. In some cases, mmW frequencies can be referred to as the FR2 band (e.g., including a frequency range of 24250 MHz to 52600 MHz). In some examples, the wireless communications system 100 can include one or more base stations (referred to herein as "hybrid base stations") that operate in both the mmW frequencies (and/or near mmW frequencies) and in sub-6 GHz frequencies (referred to as the FR1 band, e.g., including a frequency range of 450 to 6000 MHz). In some examples, the mmW base station 180, one or more hybrid base stations (not shown), and the UE 182 may utilize beamforming (transmit and/or receive) over a mmW communication link 184 to compensate for the extremely high path loss and short range. The wireless communications system 100 may further include a UE 164 that may communicate with a macro cell base station 102 over a communication link 120 and/or the mmW base station 180 over a mmW communication link 184.

In some examples, in order to operate on multiple carrier frequencies, a base station 102 and/or a UE 104 may be equipped with multiple receivers and/or transmitters. For example, a UE 104 may have two receivers, "Receiver 1" and "Receiver 2," where "Receiver 1" is a multi-band receiver that can be tuned to band (i.e., carrier frequency) 'X' or band 'Y,' and "Receiver 2" is a one-band receiver tuneable to band 'Z' only.

The wireless communications system 100 may further include one or more UEs, such as UE 190, that connect indirectly to one or more communication networks via one or more relay devices (e.g., UEs) by using device-to-device (D2D) peer-to-peer (P2P) links (referred to as "sidelinks"). In the example of FIG. 1, UE 190 has a D2D P2P link 192 with one of the UEs 104, which can be configured to operate as a relay device (e.g., through which UE 190 may indirectly communicate with base station 102). In another example, UE 190 also has a D2D P2Plink 194 with WLAN STA 152, which is connected to the WLAN AP 150 and can be configured to operate as a relay device (e.g., UE 190 may indirectly communicate with AP 150). In an example, the D2D P2P links 192 and 194 may be supported with any well-known D2D RAT, such as LTE Direct (LTE-D), Wi-Fi Direct (Wi-Fi-D), Bluetooth®, UWB, and so on.

Figure 2A:
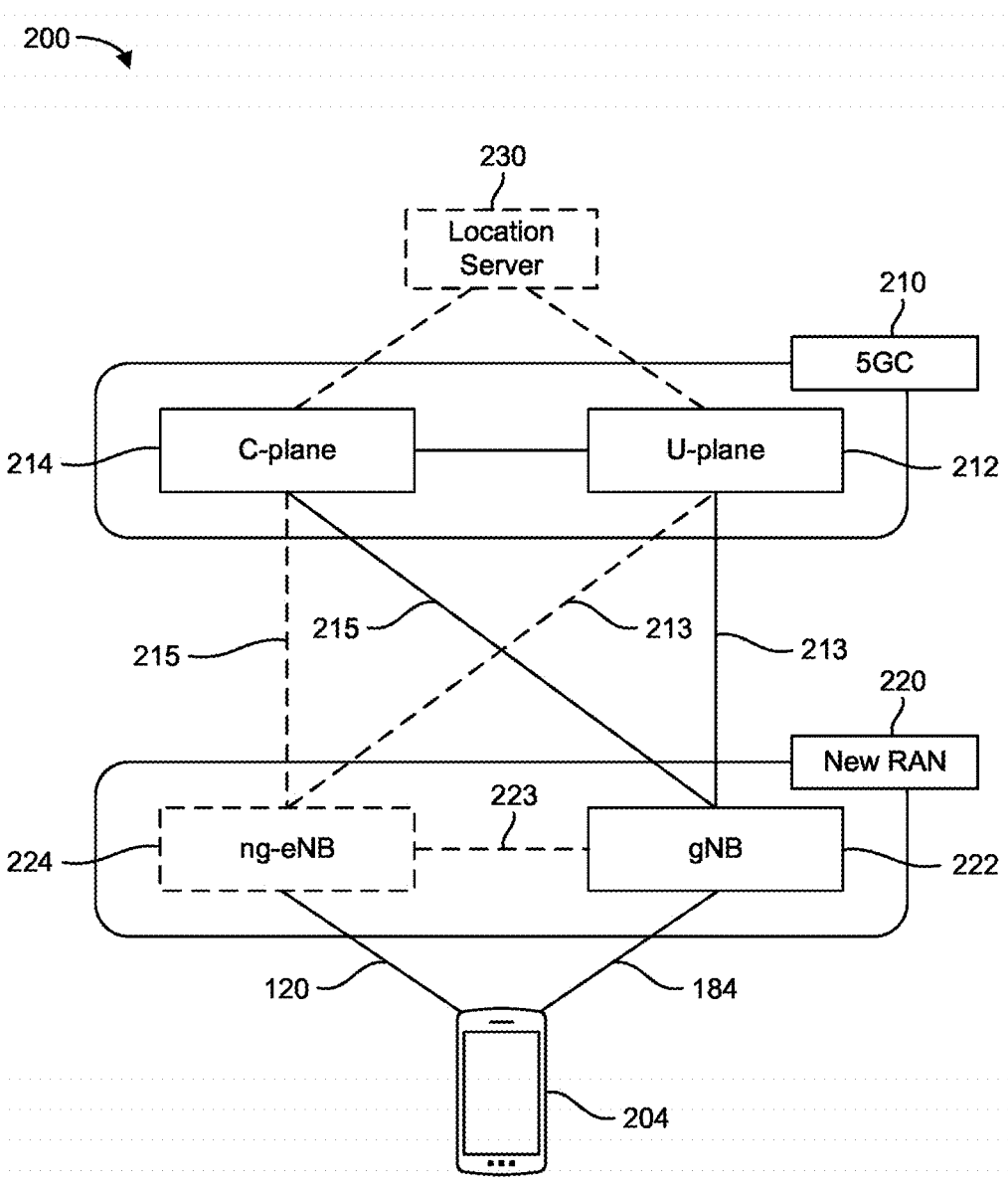
FIGS. 2A and 2B illustrate example wireless network structures, in accordance with some aspects of the present disclosure.

According to various aspects, FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. In some aspects, user plane interface (NG-U) 213 and control plane interface (NG-C) 215 can connect the gNB 222 to the 5GC 210 and specifically to the control plane functions 214 and user plane functions 212. In some examples, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations can include one or more of ng-eNBs 224 and gNBs 222. Either gNB 222 or ng-eNB 224 may communicate with UEs 204 (e.g., as illustrated in FIG. 1).

In some aspects, wireless network structure 200 can include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated with a component of the core network, or alternatively may be external to the core network. In some examples, the location server 230 can be operated by a carrier or provider of the 5GC 210, a third party, an original equipment manufacturer (OEM), or other party. In some cases, multiple location servers can be provided, such as a location server for the carrier, a location server for an OEM of a particular device, and/or other location servers. In such cases, location assistance data can be received from the location server of the carrier and other assistance data can be received from the location server of the OEM.

Figure 2B:
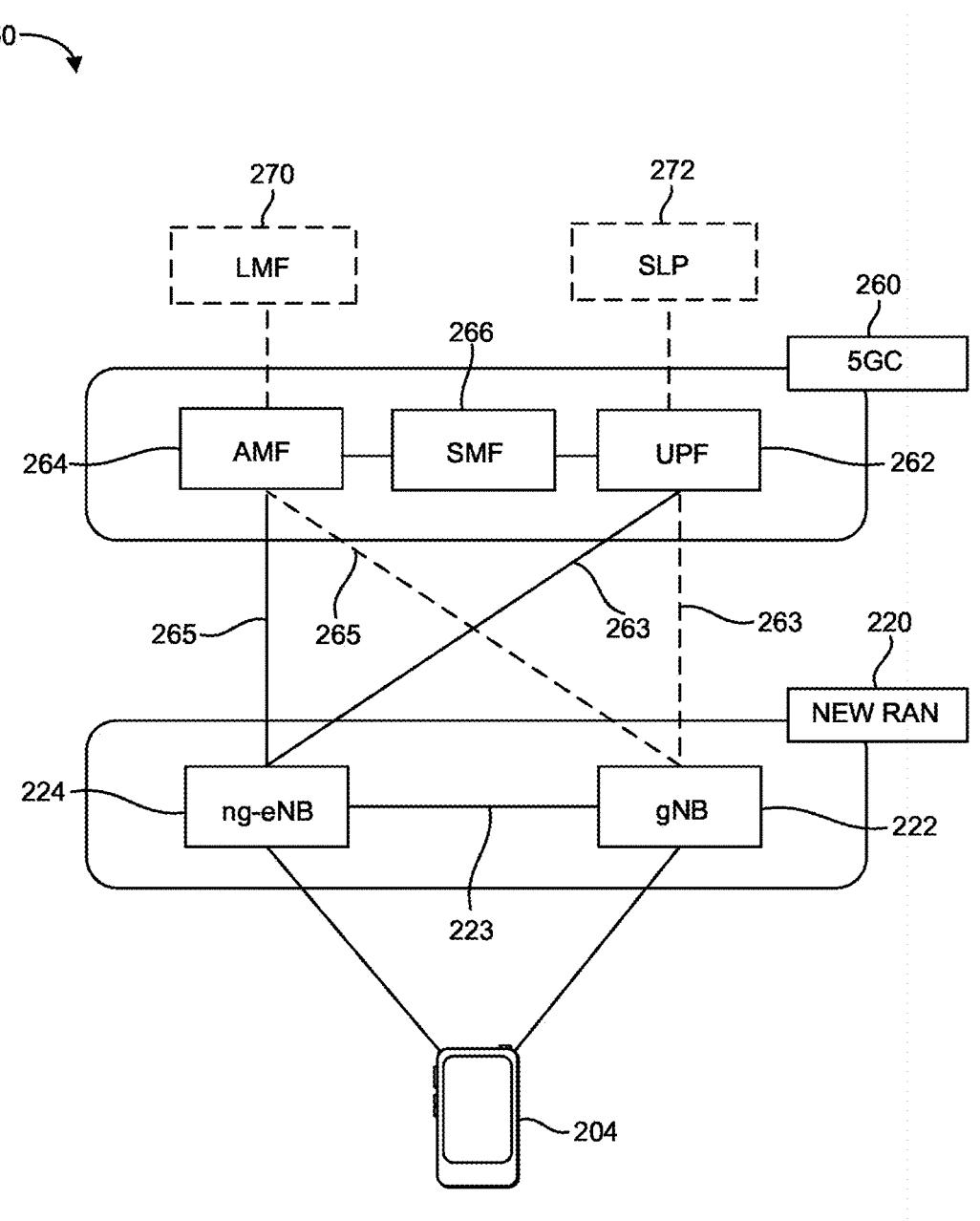

According to various aspects, FIG. 2B illustrates another example wireless network structure 250. In some examples, 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In some examples, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 can include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 can also interact with an authentication server function (AUSF) (not shown) and the UE 204, and can receive an intermediate key established as a result of the UE 204 authentication process.

In the case of authentication based on a UMTS (universal mobile telecommunications system) subscriber identity module (USIM), the AMF 264 can retrieve the security material from the AUSF. The functions of the AMF 264 can also include security context management (SCM). The SCM can receive a key from the SEAF that it can use to derive access-network specific keys. The functionality of the AMF 264 can also include location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 may also support functionalities for non-3GPP access networks.

In some cases, UPF 262 can perform functions that include serving as an anchor point for intra/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink and/or downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. In some aspects, UPF 262 may also support transfer of location services messages over a user plane between the UE 204 and a location server, such as a secure user plane location (SUPL) location platform (SLP) 272.

In some examples, the functions of SMF 266 can include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 can be referred to as the N11 interface.

In some aspects, wireless network structure 250 can include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

In some cases, LMF 270 and/or the SLP 272 may be integrated with a base station, such as the gNB 222 and/or the ng-eNB 224. When integrated with the gNB 222 and/or the ng-eNB 224, the LMF 270 and/or the SLP 272 may be referred to as a "location management component," or "LMC." As used herein, references to LMF 270 and SLP 272 include both the case in which the LMF 270 and the SLP 272 are components of the core network (e.g., 5GC 260) and the case in which the LMF 270 and the SLP 272 are components of a base station.

Figure 3:
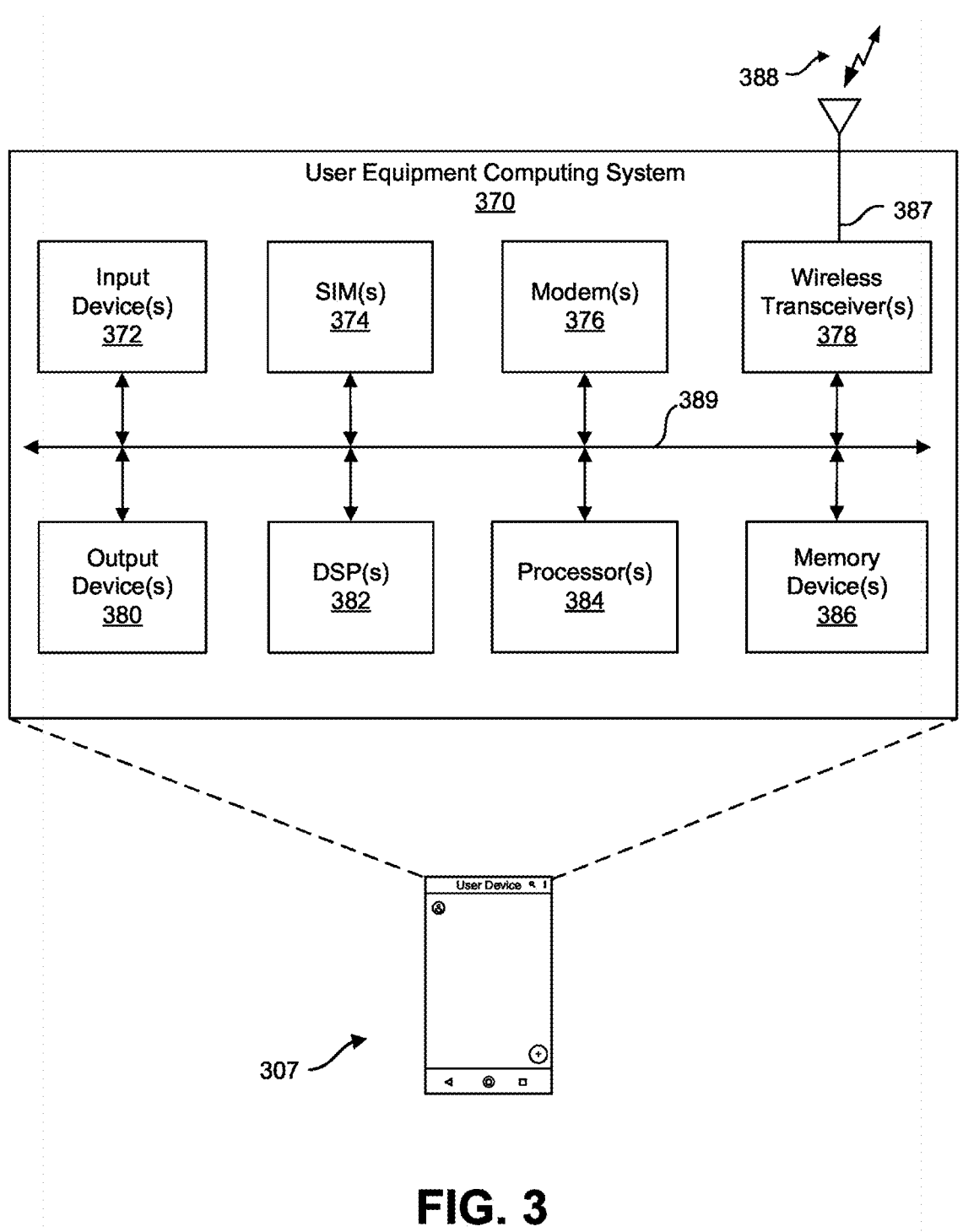
FIG. 3 illustrates an example block diagram of a computing system of a user equipment (UE) device, in accordance with some aspects of the present disclosure.

FIG. 3 illustrates an example of a computing system 370 of a user equipment (UE) 307. In some examples, the UE 307 can include a mobile phone, router, tablet computer, laptop computer, tracking device, wearable device (e.g., a smart watch, glasses, an XR device, etc.), Internet of Things (IoT) device, and/or other device used by a user to communicate over a wireless communications network. The computing system 370 includes software and hardware components that can be electrically coupled via a bus 389 (or may otherwise be in communication, as appropriate). For example, the computing system 370 includes one or more processors 384. The one or more processors 384 can include one or more CPUs, ASICs, FPGAs, APs, GPUs, VPUs, NSPs, microcontrollers, dedicated hardware, any combination thereof, and/or other processing device or system. The bus 389 can be used by the one or more processors 384 to communicate between cores and/or with the one or more memory devices 386.

The computing system 370 may also include one or more memory devices 386, one or more digital signal processors (DSPs) 382, one or more subscriber identity modules (SIMs) 374, one or more modems 376, one or more wireless transceivers 378, an antenna 387, one or more input devices 372 (e.g., a camera, a mouse, a keyboard, a touch sensitive screen, a touch pad, a keypad, a microphone, and/or the like), and one or more output devices 380 (e.g., a display, a speaker, a printer, and/or the like).

The one or more wireless transceivers 378 can transmit and receive wireless signals (e.g., signal 388) via antenna 387 to and from one or more other devices, such as one or more other UEs, network devices (e.g., base stations such as eNBs and/or gNBs, WiFi routers, etc.), cloud networks, and/or the like. As described herein, the one or more wireless transceivers 378 can include a combined transmitter/receiver, discrete transmitters, discrete receivers, or any combination thereof. In some examples, the computing system 370 can include multiple antennae. The wireless signal 388 may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network. In some examples, the one or more wireless transceivers 378 may include a radio frequency (RF) front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 388 into a baseband or intermediate frequency and can convert the RF signals to the digital domain.

In some cases, the computing system 370 can include a coding-decoding device (or CODEC) configured to encode and/or decode data transmitted and/or received using the one or more wireless transceivers 378. In some cases, the computing system 370 can include an encryption-decryption device or component configured to encrypt and/or decrypt data (e.g., according to the AES and/or DES standard) transmitted and/or received by the one or more wireless transceivers 378.

The one or more SIMs 374 can each securely store an International Mobile Subscriber Identity (IMSI) number and a related key assigned to the user of the UE 307. The IMSI and the key can be used to identify and authenticate the subscriber when accessing a network provided by a network service provider or operator associated with the one or more SIMs 374. The one or more modems 376 can modulate one or more signals to encode information for transmission using the one or more wireless transceivers 378. The one or more modems 376 can also demodulate signals received by the one or more wireless transceivers 378 in order to decode the transmitted information. In some examples, the one or more modems 376 can include a 4G (or LTE) modem, a 5G (or NR) modem, a Bluetooth™ modem, a modem configured for vehicle-to-everything (V2X) communications, and/or other types of modems. In some examples, the one or more modems 376 and the one or more wireless transceivers 378 can be used for communicating data for the one or more SIMs 374.

The computing system 370 can also include (and/or be in communication with) one or more non-transitory machine-readable storage media or storage devices (e.g., one or more memory devices 386), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various embodiments, functions may be stored as one or more computer-program products (e.g., instructions or code) in memory device(s) 386 and executed by the one or more processor(s) 384 and/or the one or more DSPs 382. The computing system 370 can also include software elements (e.g., located within the one or more memory devices 386), including, for example, an operating system, device drivers, executable libraries, and/or other code, such as one or more application programs, which may comprise computer programs implementing the functions provided by various embodiments, and/or may be designed to implement methods and/or configure systems, as described herein.

In some examples, UE 307 can implement carrier aggregation whereby UE 307 can receive and/or transmit on multiple carrier frequencies at the same time, thereby increasing downlink and uplink data rates. Thus, UE 307 may simultaneously utilize a first radio to tune to one carrier frequency (e.g., the anchor carrier) and second radio to tune to a different carrier frequency (e.g., a secondary carrier). In addition, each radio (e.g., each of the first and second radios) may be tunable to a plurality of different frequencies, one at a time.

Figure 4:
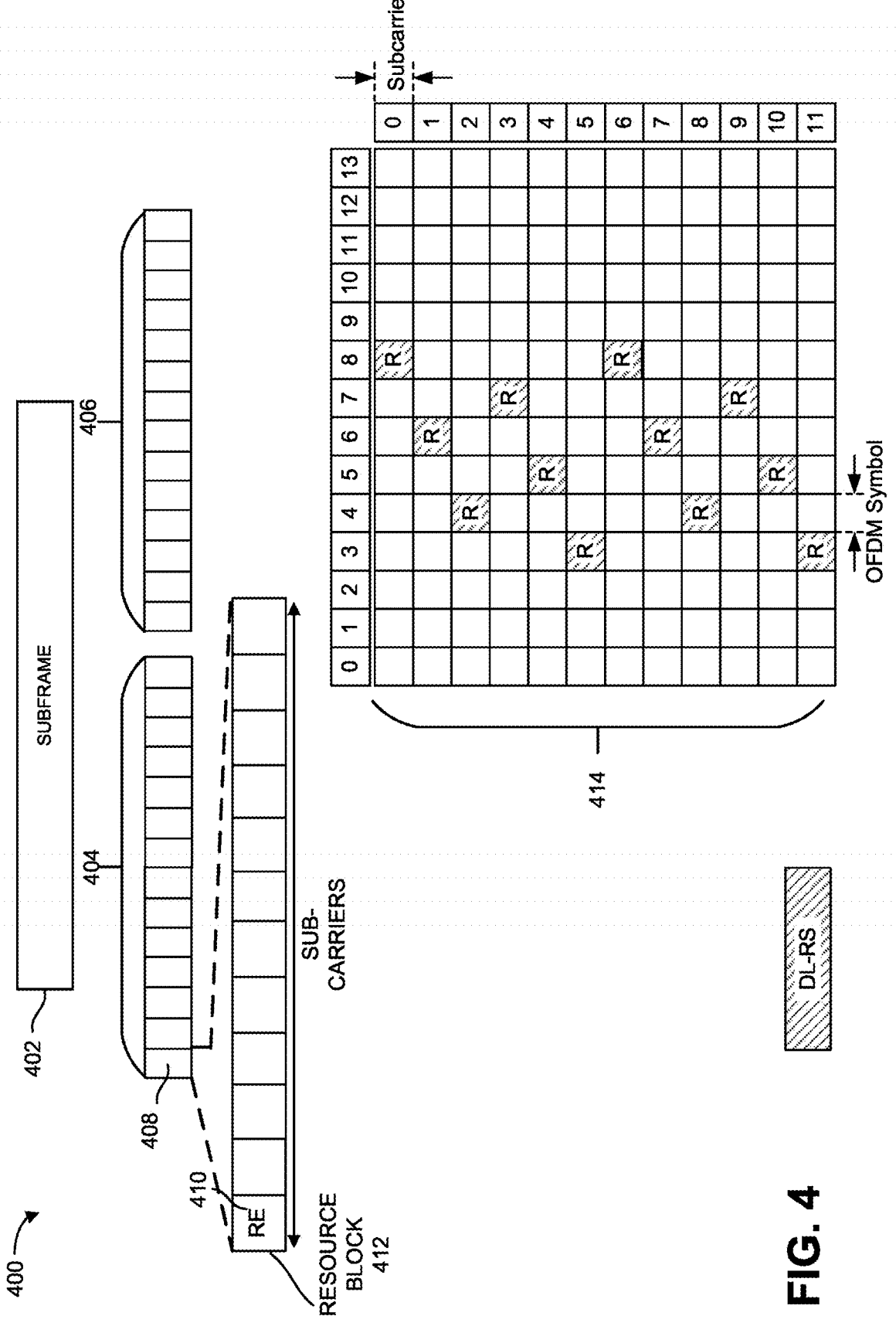
FIG. 4 illustrates an example diagram of a frame structure, in accordance with some aspects of the present disclosure.

FIG. 4 illustrates an example resource structure 400 that includes various groups of 5G/New Radio (NR) resources. For example, resource structure 400 can include a subframe 402 which can have a duration of 1 millisecond (ms) and can correspond to one of ten subframes included in a frame (not illustrated). In some examples, subframe 402 can include one or more slots such as slot 404 and slot 406. Although resource structure 400 is illustrated as having two slots per subframe, a different number of slots can be included in a subframe (e.g., 4 slots, 8 slots, 16 slots, 32 slots, or any other number of slots).

In some examples, each of slot 404 and slot 406 can include one or more orthogonal frequency-division multiplexing (OFDM) symbols such as symbol 408. As illustrated, slot 404 and slot 406 each include 14 symbols (e.g., symbol 408). In some cases, a slot may have a different number of symbols. In some aspects, each symbol can be transmitted using one or more frequency subcarriers. A symbol (e.g., symbol 408) that is transmitted on a single subcarrier can be referred to as a resource element (RE), such as RE 410. In some cases, a resource element (e.g., RE 410) can correspond to the smallest resource unit in a 5G/NR network, corresponding to one subcarrier in one OFDM symbol. In some examples, RE 410 can be identified according to its position using coordinates (k, 1), in which 'k' corresponds to the index in the frequency domain (e.g., identifies the RE sub-carrier) and '1' corresponds to the symbol position in the time domain relative to a reference point.

In some aspects, a group of 12 REs can be referred to as a resource block (RB) such as resource block 412. In some aspects, a resource grid 414 can be used to represent downlink resources. As illustrated, resource grid 414 can correspond to a slot (e.g., slot 404) having 12 subcarriers and 14 resource elements. In some aspects, some REs can be used to transmit downlink reference (pilot) signals (DL-RS). The DL-RS can include Positioning Reference Signal (PRS), Tracking Reference Signal (TRS), Phase Tracking Reference Signal (PTRS), Channel State Information Reference Signal (CSI-RS), Demodulation Reference Signal (DMRS), Primary Synchronization Signal (PSS), Secondary Synchronization Signal (SSS), etc. Resource grid 414 illustrates exemplary locations of REs used to transmit DL-RS (labeled "R").

In some examples, a collection of resource elements (REs) that are used for transmission of PRS can be referred to as a "PRS resource." The collection of resource elements can span multiple subcarriers in the frequency domain and 'N' (e.g., 1 or more) consecutive symbol(s) within a slot in the time domain.

In some aspects, the transmission of a PRS resource can have a particular comb size (also referred to as the "comb density"). A comb size 'N' represents the subcarrier spacing (or frequency/tone spacing) within each symbol of a PRS resource configuration. For example, a comb size 'N' can cause a PRS to be transmitted in every Nth subcarrier of a symbol of a PRB. For example, for comb-4, for each of the fourth symbols of the PRS resource configuration, REs corresponding to every fourth subcarrier (e.g., subcarriers 0, 4, 8) are used to transmit PRS of the PRS resource. In some examples, comb sizes of comb-2, comb-4, comb-6, and comb-12 can be used for DL-PRS. FIG. 4 illustrates an exemplary PRS resource configuration for comb-6 (which spans six symbols in the time domain and has 6 subcarriers of spacing).

Figures 5A, 5B, 5C, 5D, 5E, 5F, 5G, 5H:
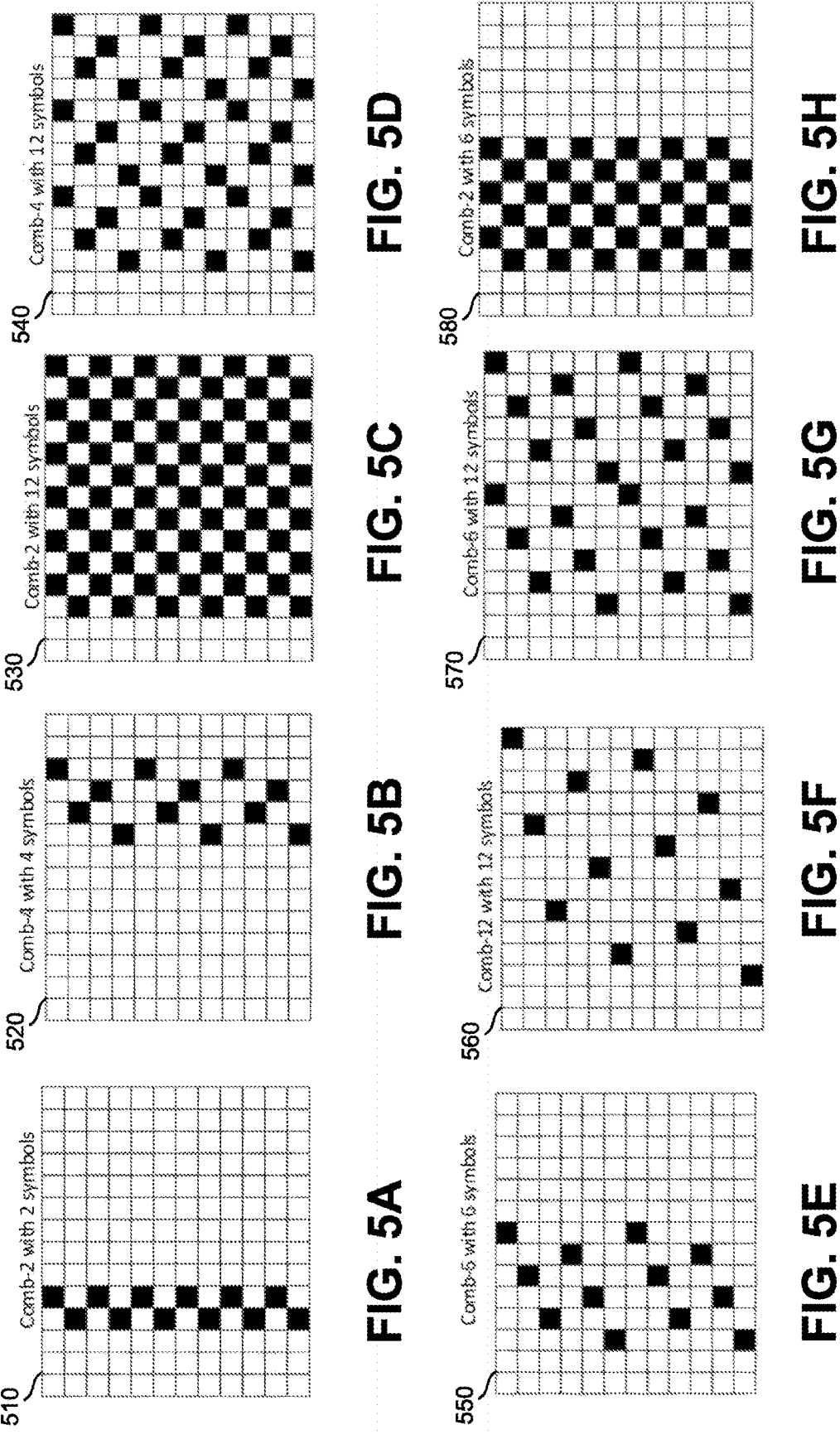
FIGS. 5A-5H illustrate example charts of comb-symbol patterns, in accordance with some aspects of the present disclosure.

FIGS. 5A-5H illustrate further examples of PRS resource configurations using different comb sizes. For example, FIG. 5A includes chart 510 which illustrates a configuration of comb-2 with 2 symbols. FIG. 5B includes chart 520 which illustrates a configuration of comb-4 with 4 symbols. FIG. 5C includes chart 530 which illustrates a configuration of comb-2 with 12 symbols. FIG. 5D includes chart 540 which illustrates a configuration of comb-4 with 12 symbols. FIG. 5E includes chart 550 which illustrates a configuration of comb-6 with 6 symbols. FIG. 5F includes chart 560 which illustrates a configuration of comb-12 with 12 symbols. FIG. 5G includes chart 570 which illustrates a configuration of comb-6 with 12 symbols. FIG. 5H includes chart 580 which illustrates a configuration of comb-2 with 6 symbols.

In some examples, configuration of the PRS resource can correspond to a pseudo-random QPSK sequence that can change periodically (e.g., per OFDM symbol, per slot, etc.). In one illustrative example, the pseudo-random sequence generator can be initialized using the relationship of equation (1) below, in which $$n_{s,f}^{\mu}$$

is the slot number, the downlink PRS sequence ID $$n_{ID,seq}^{PRS}$$

{0, 1, . . . , 4095} is obtained based on a higher level parameter (e.g., dl-PRS-SequenceID-r16), and 1 is the OFDM symbol within the slot to which the sequence is mapped. The relationship of equation (1) is provided as follows:

$$
c_{init} = \left( 2^{22} \left\lfloor \frac{n_{ID,seq}^{PRS}}{1024} \right\rfloor + 2^{10} (N_{symb}^{slot} n_{s,f}^{\mu} + l + 1)(2(n_{ID,seq}^{PRS} \bmod 1024) + 1) + (n_{ID,seq}^{PRS} \bmod 1024) \right) \bmod 2^{31}
\tag{1}
$$

In some examples, a "PRS resource set" can correspond to a set of PRS resources used for the transmission of PRS signals, where each PRS resource has a PRS resource ID. In some cases, the PRS resources in a PRS resource set can be associated with the same Transmission-Reception Point (TRP). In some aspects, a PRS resource set can be identified by a PRS resource set ID and can be associated with a specific TRP (identified by a TRP ID). In addition, the PRS resources in a PRS resource set can have the same periodicity, a common muting pattern configuration, and the same repetition factor (e.g., PRS-ResourceRepetitionFactor) across slots. In some aspects, the periodicity is the time from the first repetition of the first PRS resource of a first PRS instance to the same first repetition of the same first PRS resource of the next PRS instance. The periodicity may have a length selected from $2^{\mu} \cdot \{4, 5, 8, 10, 16, 20, 32, 40, 64, 80, 160, 320, 640, 1280, 2560, 5120, 10240\}$ slots, with $\mu$=0, 1, 2, 3. In some examples, the repetition factor may have a length selected from {1, 2, 4, 6, 8, 16, 32} slots.

In some aspects, a PRS resource ID in a PRS resource set can be associated with a single beam (and/or beam ID) transmitted from a single TRP (where a TRP may transmit one or more beams). For instance, each PRS resource of a PRS resource set may be transmitted on a different beam, and as such, a "PRS resource," or simply "resource," can also be referred to as a "beam."

In some examples, a "PRS instance" or "PRS occasion" can correspond to one instance of a periodically repeated time window (e.g., a group of one or more consecutive slots) where PRS are expected to be transmitted. A PRS occasion may also be referred to as a "PRS positioning occasion," a "PRS positioning instance," a "positioning occasion," "a positioning instance," a "positioning repetition," or simply an "occasion," an "instance," or a "repetition."

In some aspects, a "positioning frequency layer" (also referred to simply as a "frequency layer" or "layer") can be a collection of one or more PRS resource sets across one or more TRPs that have the same values for certain parameters. For example, the collection of PRS resource sets can have the same subcarrier spacing (SCS) and cyclic prefix (CP) type, the same reference point for resource grids in frequency domain (e.g., point A), the same value of the downlink PRS bandwidth, the same start PRB (and center frequency), and the same comb size.

Figure 6:
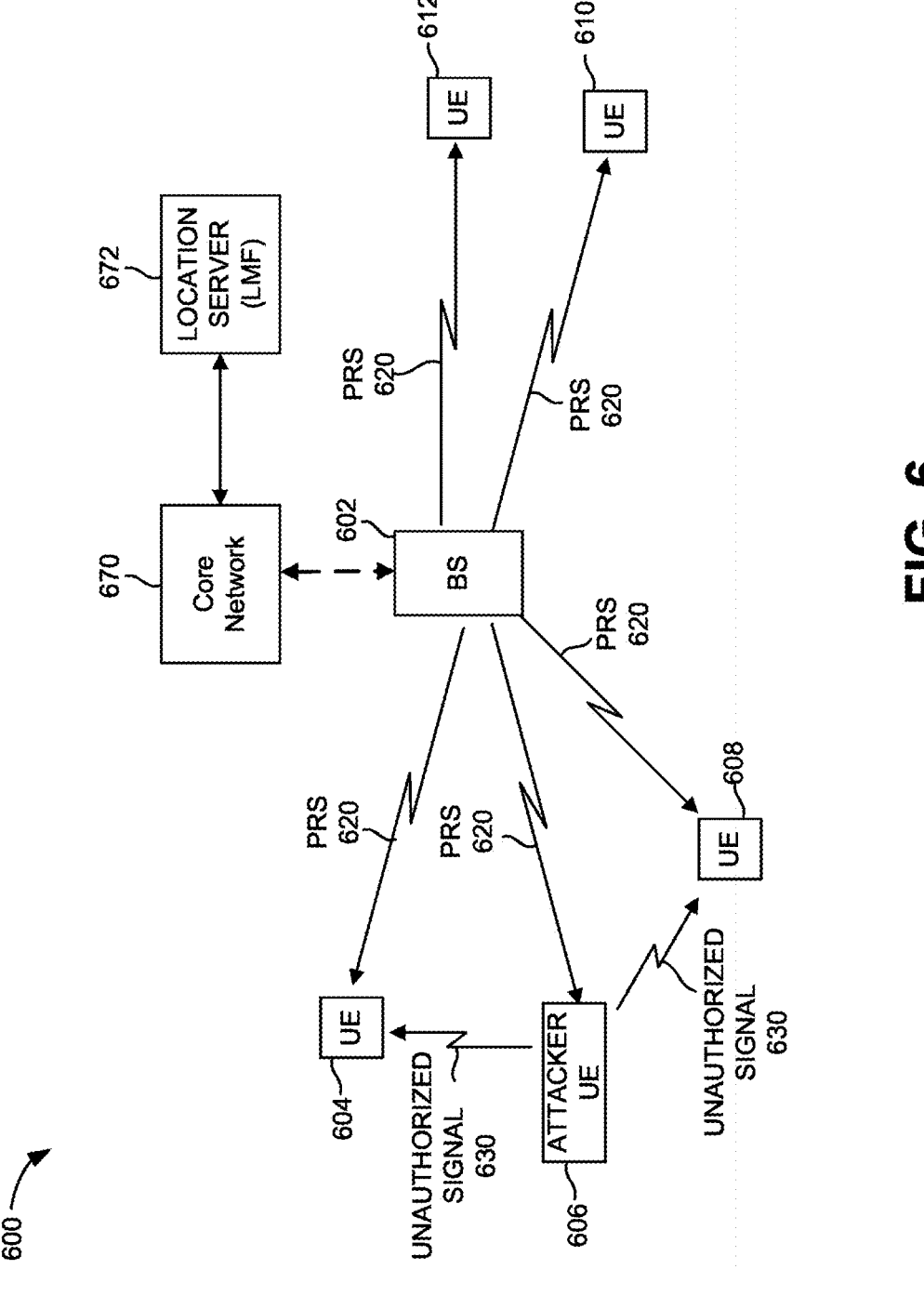
FIG. 6 illustrates another example wireless communication system, in accordance with some aspects of the present disclosure.

FIG. 6 illustrates an example of a wireless communications network 600, in accordance with some aspects of the present disclosure. In some examples, wireless communication network 600 can include a base station 602 and location server 672. In some cases, location server 672 can be configured to provide location management functions (LMF) (e.g., as described with respect to LMF 270) to one or more associated UEs (e.g., UE 604, UE 606, UE 608, UE 610, and UE 612). In some examples, base station 602 and location server 672 can communicate via core network 670.

In some implementations, network 600 can correspond to a 5G/NR network that can support cellular network-based positioning algorithms for each of the UEs. (e.g., UE 604, UE 606, UE 608, UE 610, and UE 612). In some examples, the positioning algorithms can include downlink-based, uplink-based, and downlink-and-uplink-based positioning methods. In some cases, downlink-based positioning methods can include downlink time difference of arrival (DL-TDOA) and downlink angle-of-departure (DL-AoD). For example, a UE can measure the differences between the times of arrival (ToAs) of reference signals (e.g., Positioning Reference Signal 620) received from pairs of base stations, referred to as reference signal time difference (RSTD) or time difference of arrival (TDOA) measurements. In some implementations, the UE can report the measurements to location server 672 for processing and determination of location data corresponding to the UE. In some examples, the UEs can also measure downlink reference signal reference power (DL RSRP) per beam and/or base station; UE RX-TX time difference; and/or any other parameter corresponding to a reference signal or any combination thereof.

In some aspects, location server 672 and/or base station 602 can determine a positioning reference signal (PRS) configuration that can be used to provide location services to each of the UEs in network 600 (e.g., UE 604, UE 606, UE 608, UE 610, and UE 612). In some examples, base station 602 can be configured to transmit positioning reference signal (PRS) 620 to each of the UEs in network 600. In some cases, location server 672 can send assistance data to the UEs. For example, the assistance data may include identifiers of the base stations (or the cells and/or TRPs of the base stations) from which to measure reference signals, the reference signal configuration parameters (e.g., the number of consecutive positioning subframes, periodicity of positioning subframes, muting sequence, frequency hopping sequence, reference signal identifier (ID), reference signal bandwidth, etc.), and/or other parameters applicable to the particular positioning method. In some aspects, the assistance data may originate directly from base station 602 (e.g., in periodically broadcasted overhead messages, etc.).

In some aspects, each of the UEs (e.g., UE 604, UE 606, UE 608, UE 610, and UE 612) can be configured to obtain measurements from PRS 620 (as discussed above). In some aspects, the UEs can measure the RSTD between the PRS 620 from base station 602 and each of the non-reference base stations (not illustrated). In some examples, location server 672 can determine a UE's location based on the known locations of the associated base stations and the RSTD measurements.

In some examples, an attacker (e.g., attacker UE 606) may attempt to disrupt location related service provided by base station 602 and location server 672. In some cases, attacker UE 606 may monitor and process PRS 620 in order to implement one or more attacking algorithms. Examples of attacking algorithms can include a cyclic prefix (CP) attack (e.g., attacker listens to CP at start of PRS symbol and transmits a copy of the CP); a noise attack (e.g., attacker transmits noise); a computational attack or a frequency domain attack (e.g., attacker decodes initial portion of PRS and transmits attack during second portion); a sample by sample or time-domain attack (e.g., attacker processes portion of symbol and predicts future samples); and/or any other type of attack or any combination thereof.

In some aspects, attacker UE 606 may conduct a positioning attack by transmitting unauthorized signal 630. As illustrated, UE 604 and UE 608 are within range of unauthorized signal 630. In some aspects, UE 604 and UE 608 may receive unauthorized signal 630 and detect a positioning attack. For example, unauthorized signal 630 may cause one or more measurements (e.g., DL-TDOA, DL RSRP, DL-AoD) associated with PRS 620 to fluctuate in a manner that is inconsistent with previous measurements. In some cases, UE 604 and UE 608 can perform statistical analysis on one or more measurements in order to determine whether a measurement fluctuation is indicative of a positioning attack (e.g., based on mean, standard deviation, range, median, etc.). In some aspects, UE 604 and/or UE 608 can send a message to base station 602 and/or location server 672 with an indication that a positioning attack has been detected.

In some examples, UE 604 and UE 608 can send measurements corresponding to the combined reception of PRS 620 and unauthorized signal 630 to base station 602 and/or location server 672. In some cases, location server 672 can analyze measurement data received from multiple UEs (e.g., UE 604 and UE 608) to determine a metric associated with a positioning attack. In some aspects, the metric associated with a positioning attack can include a probability of a positioning attack. In some examples, the metric associated with a positioning attack can include a security metric that can be based on a type of TX sequence (e.g., comb-type PRS pattern), an encryption algorithm, number of UEs, transmission parameters, etc. In some aspects, the metric associated with a positioning attack can include an integrity metric that can be based on statistical analysis of UE measurements (e.g., mean, mode, standard deviation, range, median, etc.) that can be used to identify outliers and/or identify geographical locations and/or UEs associated with inconsistent measurements. In some cases, the metric associated with a positioning attack can include a resilience metric that can be used to determine likelihood of recovery from a positioning attack and can be based on the number of PRS resources, the type of PRS resources, the periodicity of PRS resources, the number of transmission-reception points (TRPs), etc. In some examples, location server 672 can collect data from multiple UEs over a period of time and use artificial intelligence and/or machine learning algorithms to calculate one or more metrics associated with a positioning attack and/or determine whether a positioning attack has been detected.

In some aspects, base station 602 and/or location server 672 can determine a PRS (e.g. PRS 620) having at least two signal portions. In some examples, base station 602 can transmit only a first portion of PRS 620 and inhibit transmission of the second portion of PRS 620 in order to identify and/or detect a positioning attack. In some cases, inhibiting transmission of the second portion of PRS 620 can include puncturing, preempting, stopping, zeroing-out, muting, pausing, and/or otherwise preventing transmission of the second portion of PRS 620.

In some examples, all of the UEs (e.g., UE 604, UE 606, UE 608, UE 610, and UE 612) can be configured to receive and process the entire PRS (e.g., the first portion of the PRS and the second portion of the PRS). In some aspects, inhibiting the second portion of PRS 620 will cause UEs that are outside the range of an attacker (e.g., UE 610 and UE 612) to take measurements from a null positioning reference signal. In other aspects, inhibiting the second portion of PRS 620 will permit any UEs that are within range of an attacking UE (e.g., UE 604 and UE 608 are within range of attacker UE 606) to obtain measurements on the attacking signal (e.g., unauthorized signal 630) without any interference from PRS 620.

In some aspects, measurements obtained by UE 604 and UE 608 while PRS 620 is inhibited (e.g., during second signal portion) can be used to identify attacker UE 606. In some cases, UE 604 and UE 608 can report measurements that correspond to unauthorized signal 630 to base station 602 and/or location server 672. In some examples, location server 672 can use the measurements pertaining to unauthorized signal 630 to identify attacker UE 606 and/or identify a transmission-reception point (TRP) that is the subject of the positioning attack.

In some examples, location server 672 can use data pertaining to attacker UE 606 to configure other UEs in network 600. For example, location server 672 can determine that UE 610 and UE 612 are outside the range of attacker UE 606. In some aspects, location server 672 can send a post-puncturing indication to UE 610 and UE 612 that causes the UEs to disregard any measurements associated with the partial transmission of PRS 620. In another example, location server 672 can send a message to UE 604 and/or UE 608 with an indication of the positioning attack. In some aspects, location related applications associated with UE 604 and/or UE 608 can be temporarily suspended. In some cases, location server 672 can disable the TRP that is the subject of the positioning attack.

In some cases, transmission of a partial PRS (e.g., inhibiting portion of PRS) may be performed periodically or on a pseudo-random basis. In some examples, periodic or random transmission of a partial PRS (e.g., by base station 602) can be used to proactively identify or prevent positioning attacks. In some cases, transmission of a partial PRS can be performed dynamically (e.g., on demand), such as when base station 602 and/or location server 672 detect a possible positioning attack or receive an indication of a positioning attack from one or more UEs.

In some aspects, base station 602 and/or location server 672 can configure the first portion of PRS 620 and the second portion of PRS 620 to correspond to one or more transmission resources. In some examples, the first signal portion and the second signal portion can correspond to different portions of the same slot. In some cases, the first signal portion and the second signal portion can correspond to different portions of the same symbol. In some examples, the first portion of the symbol can correspond to a cyclic prefix of the symbol and the second portion can correspond to a data payload portion of the symbol. In some cases, the first portion of the symbol can correspond to a first repetition of a sequence within a PRS symbol and the second portion can correspond to the remaining repetitions of the sequence within the PRS symbol. For instance, a comb size 'N' pattern can include multiple repetitions of a symbol transmitted every 'N' subcarriers.

In some cases, the first signal portion and the second signal portion can correspond to different sub-bands within the bandwidth of the PRS. In some aspects, the first signal portion can correspond to one or more repetitions within multiple repetitions of a PRS resource and the second signal portion can correspond to one or more different repetitions within the repetitions of the PRS resource. In some examples, the first signal portion and the second signal portion can correspond to different instances within multiple instances of a PRS resource. In some cases, the first signal portion and the second signal portion can correspond to a first PRS beam and a second PRS beam within multiple beams of a set. In some aspects, the first signal portion and the second signal portion can correspond to a first PRS beam and a second PRS beam within multiple beams of a TRP.

Figures 7A, 7B, 7C:
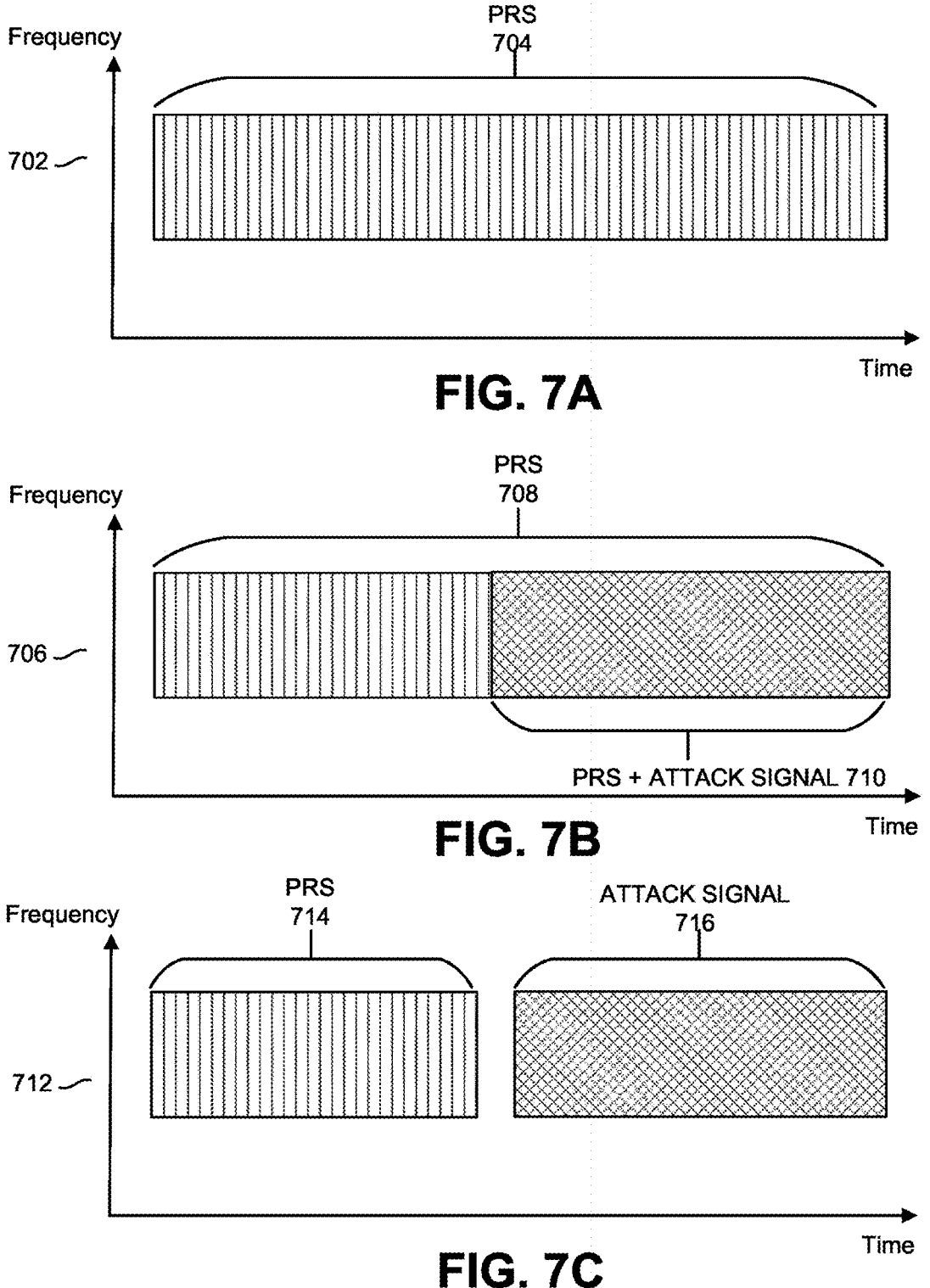
FIGS. 7A-7C illustrate examples of graphs of positioning reference signals, in accordance with some aspects of the present disclosure.

FIGS. 7A-7C illustrate examples of graphs of positioning reference signals (PRS), in accordance with some aspects of the present disclosure. FIG. 7A includes graph 702 which illustrates an example PRS 704 that is transmitted in its entirety (e.g., no portion of PRS 704 is inhibited). FIG. 7B includes graph 706 which illustrates an example PRS 708 that is subject to an attack by an authorized signal. As illustrated, the second portion 710 of the PRS includes an overlap (e.g., simultaneous transmission) of PRS and an attack signal. In some aspects, an attacking UE (e.g., attacker UE 606) may perform a time-domain attack in which the attacker receives a first part of the signal, determines a correlation, and predicts future samples. In some aspects, the attacker will transmit interfering signal in advance of the PRS from the base station.

FIG. 7C includes graph 712 which illustrates an example of a PRS that is inhibited (e.g., punctured). As illustrated the first portion (e.g., first part of time domain) of PRS 714 is transmitted and the second portion is inhibited in order to prevent and/or detect a positioning attack. Attack signal 716 (e.g., unauthorized signal 630) is transmitted by an attacking UE (e.g., attacker UE 606) during a time that corresponds to the second portion of PRS. In some aspects, transmission of attack signal 716 while PRS is inhibited can permit one or more UEs to measure parameters associated with attack signal 716 and report them to a location server or a base station.

Figures 8A, 8B, 8C:
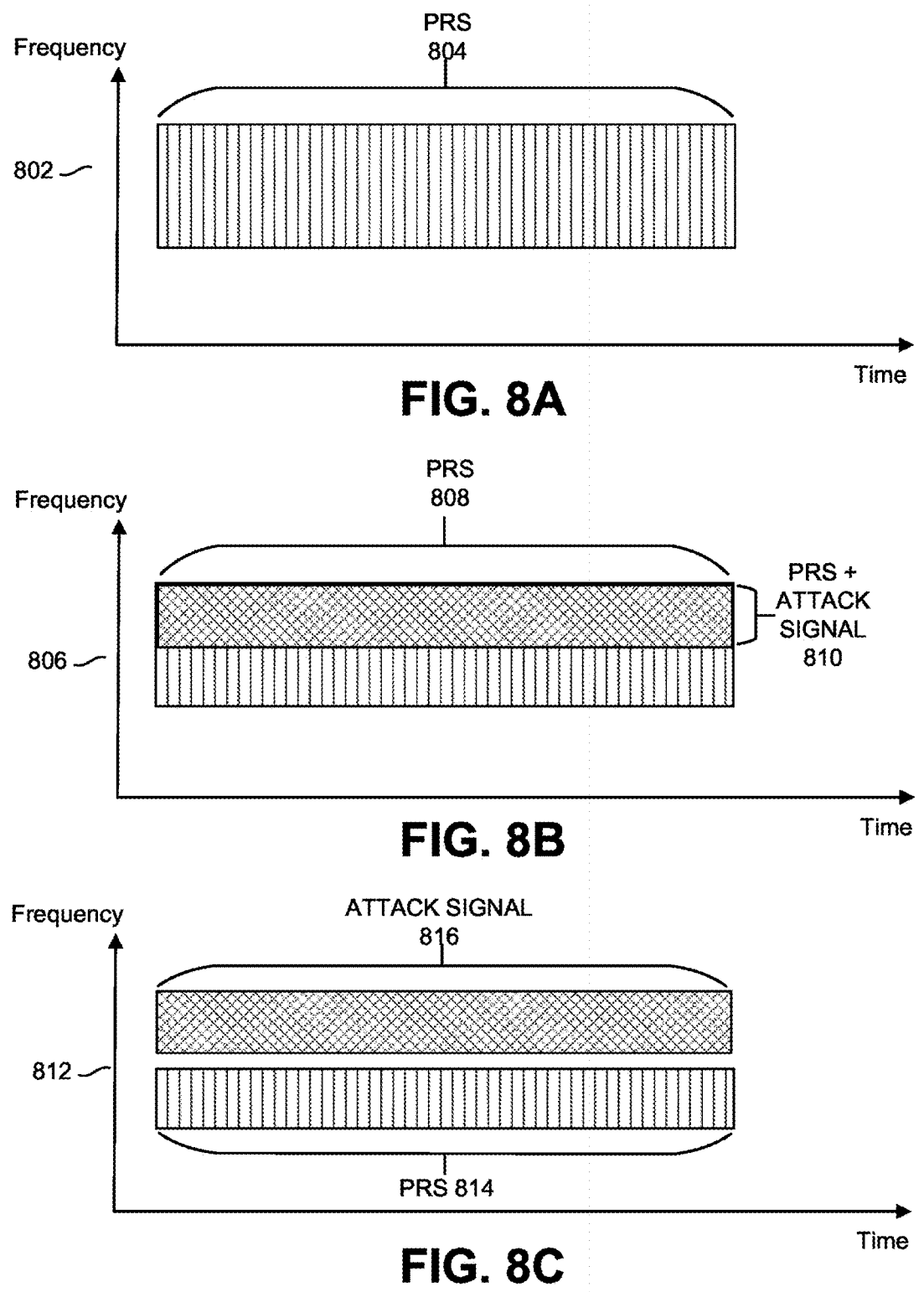
FIGS. 8A-8C illustrate further examples of graphs of positioning reference signals, in accordance with some aspects of the present disclosure.

FIGS. 8A-8C illustrate further examples of graphs of positioning reference signals, in accordance with some aspects of the present disclosure. FIG. 8A includes graph 802 which illustrates an example PRS 804 that is transmitted in its entirety (e.g., no portion of PRS 804 is inhibited). FIG. 8B includes graph 806 which illustrates an example PRS 808 that is subject to an attack by an authorized signal. As illustrated, a portion 810 of the frequencies (e.g., subcarriers) in the PRS include an overlap with an attack signal. In some aspects, an attacking UE (e.g., attacker UE 606) may perform a frequency-domain attack in which the attacker receives a first part of the signal, determines which QAM symbols are sent and determines a corresponding scrambling ID. In some aspects, the attacker will transmit an interfering signal on a portion of the subcarriers after it obtains the scrambling ID.

FIG. 8C includes graph 812 which illustrates an example of a PRS that is inhibited (e.g., punctured). As illustrated the first portion (e.g., first part of frequency domain) of PRS 814 is transmitted and the second portion is inhibited in order to prevent and/or detect a positioning attack. Attack signal 816 (e.g., unauthorized signal 630) is transmitted by an attacking UE (e.g., attacker UE 606) using frequency components that correspond to the second portion of PRS. In some aspects, transmission of attack signal 816 while PRS is inhibited can permit one or more UEs to measure parameters associated with attack signal 816 and report them to a location server or a base station.

Figures 9A, 9B, 9C:
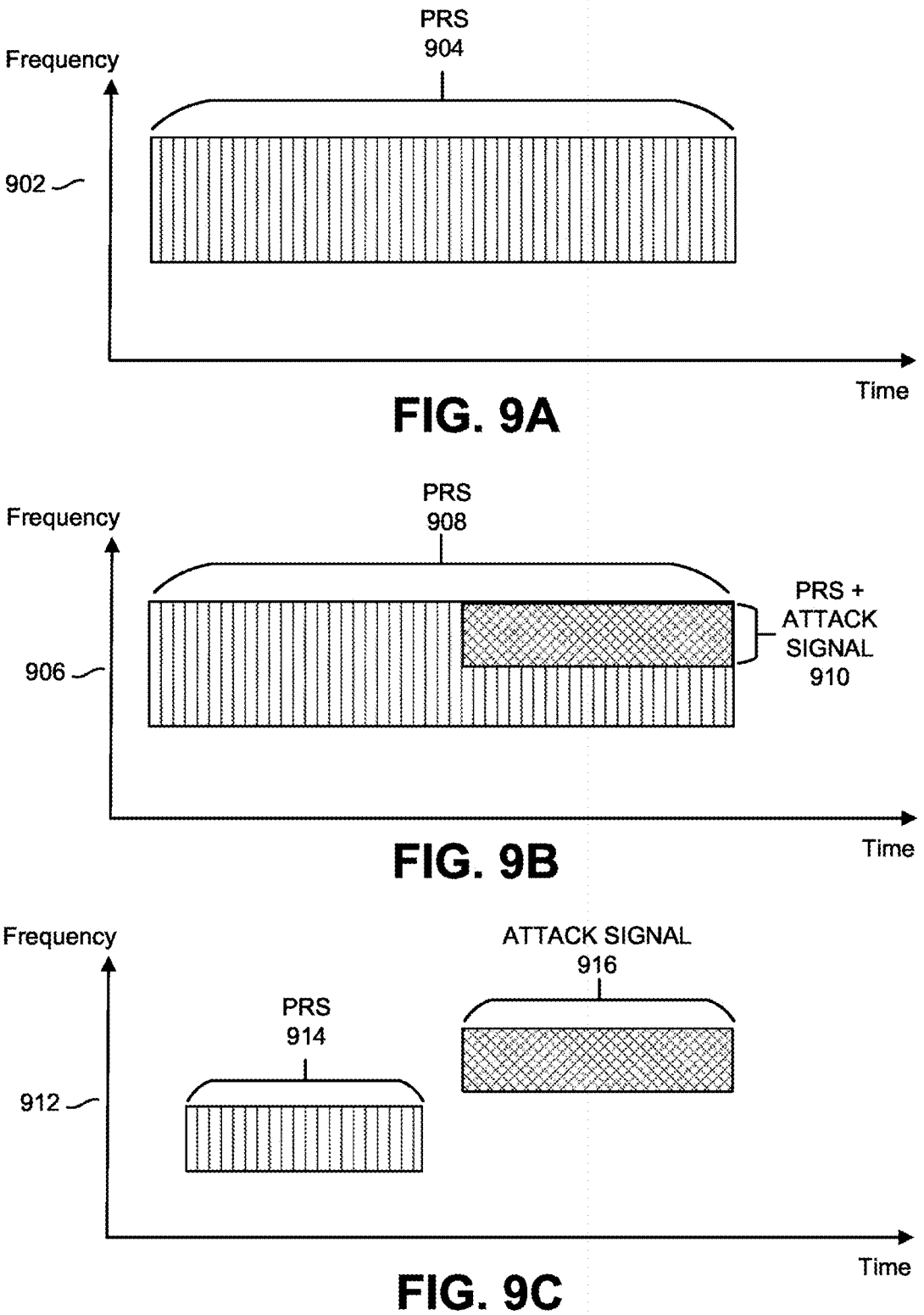
FIGS. 9A-9C illustrate further examples of graphs of positioning reference signals, in accordance with some aspects of the present disclosure.

FIGS. 9A-9C illustrate further examples of graphs of positioning reference signals, in accordance with some aspects of the present disclosure. FIG. 9A includes graph 902 which illustrates an example PRS 904 that is transmitted in its entirety (e.g., no portion of PRS 904 is inhibited). FIG. 9B includes graph 906 which illustrates an example PRS 908 that is subject to an attack by an authorized signal. As illustrated, a portion 910 of the frequencies (e.g., sub-carriers) and time components (e.g., symbols) in the PRS include an overlap with an attack signal. In some aspects, an attacking UE (e.g., attacker UE 606) may perform an attack that targets frequency and time elements of PRS 908.

FIG. 9C includes graph 912 which illustrates an example of a PRS that is inhibited (e.g., punctured). As illustrated the first portion (e.g., first part of frequency and time domains) of PRS 914 is transmitted and the second portion is inhibited (e.g., frequency and time components are punctured) in order to prevent and/or detect a positioning attack. Attack signal 916 (e.g., unauthorized signal 630) is transmitted by an attacking UE (e.g., attacker UE 606) using frequency and time components that correspond to the second portion of PRS. In some aspects, transmission of attack signal 916 while PRS is inhibited can permit one or more UEs to measure parameters associated with attack signal 916 and report them to a location server or a base station.

FIG. 10 is a flow chart diagram illustrating an example of a process 1000 of performing wireless position signaling for detecting and/or preventing new radio positioning attacks, according to the systems and techniques described herein. At block 1002, the process 1000 includes determining a positioning reference signal having at least a first signal portion and at least a second signal portion. For example, base station 602 can determine positioning reference signal (PRS) 620. In some examples, base station 602 can receive a configuration corresponding to PRS 620 from location server 672 (e.g., via core network 670).

In some examples, the first signal portion corresponds to a first portion of a slot and the second signal portion corresponds to a second portion of the slot. In some examples, the first signal portion corresponds to a first portion of a symbol and the second signal portion corresponds to a second portion of the symbol. In one illustrative example, the first portion of the symbol corresponds to a cyclic prefix. In some examples, the first signal portion corresponds to a first sub-band within a bandwidth of the positioning reference signal and the second signal portion corresponds to a second sub-band within the bandwidth of the positioning reference signal. In some examples, the first signal portion corresponds to a first beam from a plurality of beams associated with a transmission-reception point (TRP) and the second signal portion corresponds to a second beam from the plurality of beams associated with the TRP.

At block 1004, the process 1000 includes transmitting (e.g., via at least one transceiver, via at least one transmitter, etc.) the first signal portion of the positioning reference signal to a plurality of user equipment (UE) devices. For example, base station 602 can transmit the first portion of PRS 620 to UE 604, UE 606, UE 608, UE 610, and/or UE 612. At block 1006, the process 1000 includes obtaining an indication of transmission preemption of the second signal portion of the positioning reference signal, wherein the plurality of UE devices are configured to process the first signal portion and the second signal portion. In some cases, the indication of transmission preemption can be obtained by a message or configuration that is received from a location server (e.g., base station 602 can receive indication from LMF 672) and/or from a UE device (e.g., UE 604, UE 608, UE 610, and/or UE 612). In some examples, a base station may obtain an indication of transmission preemption based on one or more measurements received from one or more UE devices (e.g., directly of from a location server). In some cases, the measurements received from a UE can include Downlink Reference Signal Reference Power (DL RSRP); Downlink Reference Signal Time Difference (DL RSTD); Downlink Time Difference of Arrival (DL TDOA); Downlink Angle-of-Departure (DL-AoD); multi-cell round trip time (RTT); any other signal measurement/parameter and/or any combination thereof. In some examples, a base station may obtain an indication of transmission preemption based on one or more measurements performed by the base station. In some cases, the measurements performed by the base station can include Uplink Angle-of-Arrival (UL-AoA); uplink reference signal receive power (UL-RSRP); uplink relative time of arrival (UL-RTOA); uplink time difference of arrival (UL-TDOA); any other signal measurement/parameter and/or any combination thereof.

In some examples, the process 1000 includes determining a metric associated with a positioning attack. In some cases, the metric associated with the positioning attack can include a probability of a positioning attack, a security metric, an integrity metric, a resiliency metric, any other metric, or any combination thereof.

In some examples, the positioning attack can include transmission of an unauthorized signal configured to interfere with the positioning reference signal. For example, attacker UE 606 can transmit unauthorized signal 630 in order to interfere with PRS 620. In some cases, the metric associated with the positioning attack is based on an indication received from at least one UE device from the plurality of UE devices. For instance, the metric associated with the positioning attack can be based on an indication received from UE 604 and/or UE 608. In some cases, the metric associated with the positioning attack is based on a plurality of position measurements received from the plurality of UE devices. In some examples, inhibiting transmission of the second signal portion of the positioning reference signal is in response to determining that the probability of the positioning attack is greater than a threshold value. For example, base station 602 and/or LMF 672 can determine that the probability that attacker UE 606 is transmitting (or will transmit) unauthorized signal 630 is higher than a threshold value (e.g., based on one or more measurements, parameters, statistical analysis, machine learning, etc.).

FIG. 11 is a flow chart diagram illustrating an example of a process 1100 of performing wireless position signaling for detecting and/or preventing new radio positioning attacks, according to the systems and techniques described herein. At block 1102, the process 1100 includes determining, by a location server, a positioning reference signal having at least a first signal portion and at least a second signal portion. For example, location server 672 can determine positioning reference signal (PRS) 620. In some examples, location server 672 can provide a configuration corresponding to PRS 620 to base station 602 (e.g., via core network 670). In some cases, base station 602 can provide a configuration corresponding to PRS 620 to location server 672 (e.g., via core network 670).

In some aspects, the first signal portion can correspond to a first portion of a slot and the second signal portion can correspond to a second portion of the slot (e.g., slot 404. In some examples, the first signal portion can correspond to a first portion of a symbol and the second signal portion can correspond to a second portion of the symbol (e.g., symbol 408). In some cases, the first portion of the symbol can correspond to a cyclic prefix. In some examples, the first signal portion can correspond to a first sub-band within a bandwidth of the positioning reference signal and the second signal portion can correspond to a second sub-band within the bandwidth of the positioning reference signal (e.g., one or more sub-carriers as illustrated in connection with resource grid 414). In some aspects, the first signal portion can correspond to a first beam from a plurality of beams associated with a transmission-reception point (TRP) and the second signal portion can correspond to a second beam from the plurality of beams associated with the TRP.

At block 1104, the process 1100 includes obtaining an indication of a positioning attack associated with the positioning reference signal. In some examples, an indication of a positioning attack can be provided to a location server (e.g., LMF 672) by a base station (e.g., base station 602) and/or one or more UEs (e.g., UE 604 and/or UE 608). In some aspects, a location server may obtain an indication of a positioning attack based on one or more measurements received from one or more UEs. In some cases, the measurements received from a UE can include Downlink Reference Signal Reference Power (DL RSRP); Downlink Reference Signal Time Difference (DL RSTD); Downlink Time Difference of Arrival (DL TDOA); Downlink Angle-of-Departure (DL-AoD); multi-cell round trip time (RTT); any other signal measurement/parameter and/or any combination thereof. In some examples, a location server may obtain an indication of a positioning attack based on one or more measurements receive from one or more base stations. In some cases, the measurements received from a base station can include Uplink Angle-of Arrival (UL-AoA); uplink reference signal receive power (UL-RSRP); uplink relative time of arrival (UL-RTOA); uplink time difference of arrival (UL-TDOA); any other signal measurement/parameter and/or any combination thereof.

In some examples, a server (e.g., LMF 672) can determine an indication of a positioning attack by performing statistical analysis on one or more measurements received from a base station and/or a UE (e.g., based on mean, standard deviation, range, median, etc.). In some aspects, obtaining the indication of the positioning attack can include determining a metric associated with the positioning attack. For example, location server 672 can analyze measurement data received from multiple UEs (e.g., UE 604 and UE 608) and/or a base station (e.g., base station 602) to determine a metric associated with a positioning attack. In some cases, a metric associated with a positioning attack can be based on a plurality of position measurements provided by a plurality of UE devices (e.g., UE 604, UE 608, UE 610, and/or UE 612). In some examples, the metric associated with a positioning attack can include a probability of a positioning attack, a security metric, an integrity metric, a resilience metric, any other type of suitable metric, and/or any combination thereof. In some cases, a server (e.g., LMF 672) can use artificial intelligence and/or machine learning algorithms to calculate one or more metrics associated with a positioning attack and/or determine whether a positioning attack has been detected.

At block 1106, the process 1100 includes providing, to a base station, a message of transmission preemption of the second signal portion of the positioning reference signal based on the indication of the positioning attack. For example, LMF 672 can send a message to base station 602 (e.g., via core network 670) that can provide an indication, command, configuration, and/or otherwise cause base station 602 to inhibit (e.g., preempt, puncture, stop, zero-out, mute, pause, etc.) transmission of the second signal portion of the positioning reference signal (e.g., PRS 620). In some aspects, providing the message of transmission preemption of the second signal portion can be in response to determining that the metric associated with the positioning attack is greater than a threshold value. In some examples, a plurality of user equipment (UE) devices can be configured to process the first signal portion and the second signal portion. For instance, UE 604 and UE 608 can each be configured to process a first portion of PRS 620 and a second portion of PRS 620 that is preempted by bases station 602 based on the message of transmission preemption from LMF 672.

In some aspects, the process can include receiving at least one signal measurement associated with an unauthorized signal transmitted using one or more resources corresponding to the second signal portion. For example, LMF 672 can receive a signal measurement from UE 604 and/or UE 608 that is associated with unauthorized signal 630 which was transmitted by attacker UE 606 using transmission resources corresponding to a preempted portion of PRS 620. In some cases, the process can include identifying a transmission-reception point (TRP) associated with the positioning attack based on the at least one signal measurement. For instance, LMF 672 can identify a TRP that is associated with attacker UE 606 based on measurements received from UE 604 and/or UE 608.

In some examples, the process can include identifying one or more UE devices that are outside a range of the unauthorized signal and configuring the one or more UE devices to ignore the positioning reference signal. For example, LMF 672 can determine that UE 610 and/or UE 612 are outside the range of unauthorized signal 630 and can configure UE 610 and/or UE 612 to ignore PRS 620.

In some examples, the process 1000 includes receiving (e.g., via at least one transceiver, via at least one receiver, etc.) at least one signal measurement associated with an unauthorized signal transmitted using one or more resources corresponding to the second signal portion. In some cases, the process 1000 can include identifying a transmission-reception point (TRP) associated with a positioning attack based on the at least one signal measurement. In some cases, the process 1000 can include identifying a portion of the plurality of UE devices that are outside a range of the unauthorized signal. In such cases, the process 1000 can include transmitting (e.g., via at least one transceiver, via at least one transmitter, etc.) a message to the portion of the plurality of UE devices with an indication to ignore the positioning reference signal.

In some examples, the processes described herein (e.g., processes 1000, 1100, and/or other process described herein) may be performed by a computing device or apparatus. In one example, processes 1000 and 1100 can be performed by a computing device or the computing system 1200 shown in FIG. 12.

The computing device can include any suitable UE or device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including process 1000 and process 1100. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), Vision Processing Units (VPUs), Network Signal Processors (NSPs), microcontrollers (MCUs) and/or other suitable electronic circuits), and/or can include and/or be implemented using computer software, firmware, or any combination thereof, to perform the various operations described herein.

The processes 1000 and 1100 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 1000, 1100, and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 12:
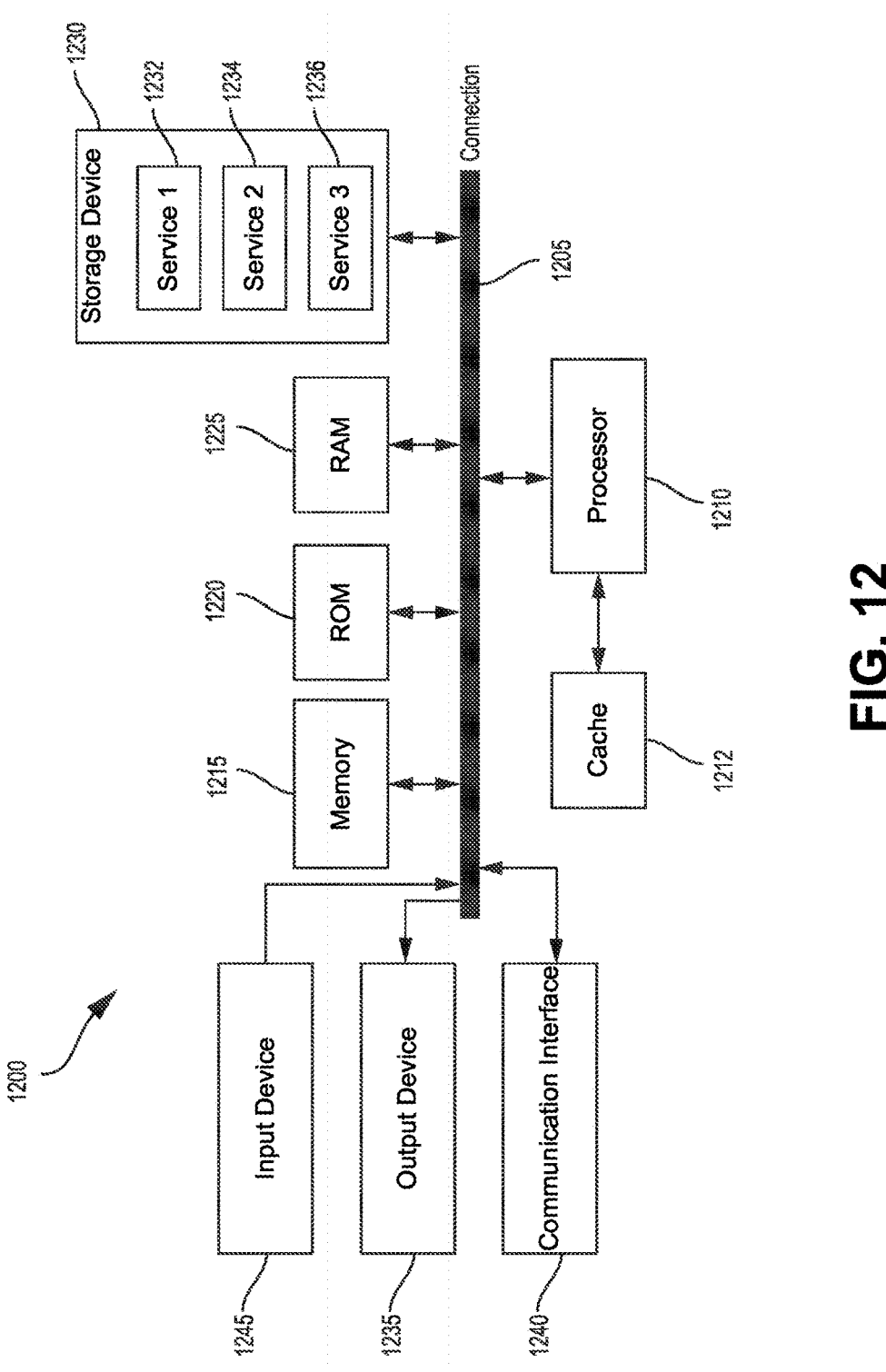
FIG. 12 illustrates an example computing system, according to aspects of the disclosure.

FIG. 12 is a diagram illustrating an example of a system for implementing certain aspects of the present technology. In particular, FIG. 12 illustrates an example of computing system 1200, which can be for example any computing device making up internal computing system, a remote computing system, a camera, or any component thereof in which the components of the system are in communication with each other using connection 1205. Connection 1205 can be a physical connection using a bus, or a direct connection into processor 1210, such as in a chipset architecture. Connection 1205 can also be a virtual connection, networked connection, or logical connection.

In some embodiments, computing system 1200 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1200 includes at least one processing unit (CPU or processor) 1210 and connection 1205 that couples various system components including system memory 1215, such as read-only memory (ROM) 1220 and random access memory (RAM) 1225 to processor 1210. Computing system 1200 can include a cache 1212 of high-speed memory connected directly with, in close proximity to, or integrated as part of processor 1210.

Processor 1210 can include any general purpose processor and a hardware service or software service, such as services 1232, 1234, and 1236 stored in storage device 1230, configured to control processor 1210 as well as a special-purpose processor where software instructions are incorporated into the actual processor design. Processor 1210 may essentially be a completely self-contained computing system, containing multiple cores or processors, a bus, memory controller, cache, etc. A multi-core processor may be symmetric or asymmetric.

To enable user interaction, computing system 1200 includes an input device 1245, which can represent any number of input mechanisms, such as a microphone for speech, a touch-sensitive screen for gesture or graphical input, keyboard, mouse, motion input, speech, etc. Computing system 1200 can also include output device 1235, which can be one or more of a number of output mechanisms. In some instances, multimodal systems can enable a user to provide multiple types of input/output to communicate with computing system 1200. Computing system 1200 can include communications interface 1240, which can generally govern and manage the user input and system output.

The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1240 may also include one or more Global Navigation Satellite System (GNSS) receivers or transceivers that are used to determine a location of the computing system 1200 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1230 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/ pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/ L5/L#), resistive random-access memory (RRAM/Re-RAM), phase change memory (PCM), spin transfer torque RAM (STT-RAM), another memory chip or cartridge, and/ or a combination thereof.

The storage device 1230 can include software services, servers, services, etc., that when the code that defines such software is executed by the processor 1210, it causes the system to perform a function. In some embodiments, a hardware service that performs a particular function can include the software component stored in a computer-readable medium in connection with the necessary hardware components, such as processor 1210, connection 1205, output device 1235, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections.

Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the disclosure include:

Aspect 1: An apparatus for detecting a positioning attack, the apparatus comprising: at least one transceiver; at least one memory; at least one processor coupled to the at least one transceiver and the at least one memory and configured to: determine a positioning reference signal having at least a first signal portion and at least a second signal portion;

transmit, via the at least one transceiver, the first signal portion of the positioning reference signal to a plurality of user equipment devices; obtain an indication of transmission preemption of the second signal portion of the positioning reference signal, wherein the plurality of UE devices are configured to process the first signal portion and the second signal portion.

Aspect 2: The apparatus of Aspect 1, wherein the at least one processor is configured to: determine a metric associated with a positioning attack, wherein the positioning attack includes transmission of an unauthorized signal configured to interfere with the positioning reference signal.

Aspect 3: The apparatus of any of Aspects 1 to 2, wherein the metric associated with the positioning attack is based on an indication received from at least one UE device from the plurality of UE devices.

Aspect 4: The apparatus of any of Aspects 1 to 3, wherein the metric associated with the positioning attack is based on a plurality of position measurements received from the plurality of UE devices.

Aspect 5: The apparatus of any of Aspects 1 to 4, wherein the at least one processor is configured to inhibit transmission of the second signal portion of the positioning reference signal in response to determining that the metric associated with the positioning attack is greater than a threshold value.

Aspect 6: The apparatus of any of Aspects 1 to 5, wherein the first signal portion corresponds to a first portion of a slot and the second signal portion corresponds to a second portion of the slot.

Aspect 7: The apparatus of any of Aspects 1 to 6, wherein the first signal portion corresponds to a first portion of a symbol and the second signal portion corresponds to a second portion of the symbol.

Aspect 8: The apparatus of any of Aspects 1 to 7, wherein the first portion of the symbol corresponds to a cyclic prefix.

Aspect 9: The apparatus of any of Aspects 1 to 8, wherein the first signal portion corresponds to a first sub-band within a bandwidth of the positioning reference signal and the second signal portion corresponds to a second sub-band within the bandwidth of the positioning reference signal.

Aspect 10: The apparatus of any of Aspects 1 to 9, wherein the first signal portion corresponds to a first beam from a plurality of beams associated with a transmission-reception point and the second signal portion corresponds to a second beam from the plurality of beams associated with the TRP.

Aspect 11: The apparatus of any of Aspects 1 to 10, wherein the at least one processor is configured to: receive, via the at least one transceiver, at least one signal measurement associated with an unauthorized signal transmitted using one or more resources corresponding to the second signal portion.

Aspect 12: The apparatus of any of Aspects 1 to 11, wherein the at least one processor is configured to: identify a transmission-reception point associated with a positioning attack based on the at least one signal measurement.

Aspect 13: The apparatus of any of Aspects 1 to 12, wherein the at least one processor is configured to: identify a portion of the plurality of UE devices that are outside a range of the unauthorized signal; transmit, via the at least one transceiver, a message to the portion of the plurality of UE devices with an indication to ignore the positioning reference signal.

Aspect 14: A method of performing any of the operations of Aspects 1 to 13.

Aspect 15: A computer-readable storage medium storing instructions that, when executed, cause one or more processors to perform any of the operations of Aspects 1 to 13.

Aspect 16: An apparatus comprising means for performing any of the operations of Aspects 1 to 13.

Aspect 17: An apparatus for detecting a positioning attack, the apparatus comprising: at least one transceiver; at least one memory; at least one processor coupled to the at least one transceiver and the at least one memory and configured to: determine a positioning reference signal having at least a first signal portion and at least a second signal portion; obtain an indication of a positioning attack associated with the positioning reference signal; and provide, to a base station, a message of transmission preemption of the second signal portion of the positioning reference signal based on the indication of the positioning attack.

Aspect 18: The apparatus of Aspect 17, wherein to obtain the indication of the positioning attack the at least one processor is further configured to: determine a metric associated with the positioning attack.

Aspect 19: The apparatus of Aspect 18, wherein the metric associated with the positioning attack is based on a plurality of position measurements provided by a plurality of UE devices.

Aspect 20: The apparatus of any of Aspects 18 to 19, wherein the message of transmission preemption of the second signal portion is provided in response to a determination that the metric associated with the positioning attack is greater than a threshold value.

Aspect 21: The apparatus of any of Aspects 17 to 20, wherein the first signal portion corresponds to a first portion of a slot and the second signal portion corresponds to a second portion of the slot.

Aspect 22: The apparatus of any of Aspects 17 to 21, wherein the first signal portion corresponds to a first portion of a symbol and the second signal portion corresponds to a second portion of the symbol.

Aspect 23: The apparatus of Aspect 22, wherein the first portion of the symbol corresponds to a cyclic prefix.

Aspect 24: The apparatus of any of Aspects 17 to 23, the first signal portion corresponds to a first sub-band within a bandwidth of the positioning reference signal and the second signal portion corresponds to a second sub-band within the bandwidth of the positioning reference signal.

Aspect 25: The apparatus of any of Aspects 17 to 24, wherein the first signal portion corresponds to a first beam from a plurality of beams associated with a transmission-reception point (TRP) and the second signal portion corresponds to a second beam from the plurality of beams associated with the TRP.

Aspect 26: The apparatus of any of Aspects 17 to 25, wherein the at least one processor is further configured to: receive at least one signal measurement associated with an unauthorized signal transmitted using one or more resources corresponding to the second signal portion.

Aspect 27: The apparatus of Aspect 26, wherein the at least one processor is further configured to: identify a transmission-reception point (TRP) associated with the positioning attack based on the at least one signal measurement.

Aspect 28: The apparatus of Aspect 26, wherein the at least one processor is further configured to: identify one or more UE devices that are outside a range of the unauthorized signal; and configure the one or more UE devices to ignore the positioning reference signal.

Aspect 29: The apparatus of any of Aspects 17 to 28, wherein a plurality of user equipment (UE) devices are configured to process the first signal portion and the second signal portion.

Aspect 30: A method of performing any of the operations of Aspects 17 to 29.

Aspect 31: A computer-readable storage medium storing instructions that, when executed, cause one or more processors to perform any of the operations of Aspects 17 to 29.

Aspect 32: An apparatus comprising means for performing any of the operations of Aspects 17 to 29.

What is claimed is:

1. A method of detecting a positioning attack, comprising:
determining, by a location server, a positioning reference signal having at least a first signal portion and at least a second signal portion;
obtaining an indication of a positioning attack associated with the positioning reference signal; and
providing, to a base station, a message of transmission preemption of the second signal portion of the positioning reference signal based on the indication of the positioning attack, wherein the message of transmission preemption provides an indication to the base station to inhibit transmission of the second signal portion of the positioning reference signal periodically or on a pseudo-random basis.

2. The method of claim 1, wherein obtaining the indication of the positioning attack comprises:
determining a metric associated with the positioning attack.

3. The method of claim 2, wherein the metric associated with the positioning attack is based on a plurality of position measurements provided by a plurality of UE devices.

4. The method of claim 2, wherein providing the message of transmission preemption of the second signal portion is in response to determining that the metric associated with the positioning attack is greater than a threshold value.

5. The method of claim 1, wherein the first signal portion corresponds to a first portion of a slot and the second signal portion corresponds to a second portion of the slot.

6. The method of claim 1, wherein the first signal portion corresponds to a first portion of a symbol and the second signal portion corresponds to a second portion of the symbol.

7. The method of claim 6, wherein the first portion of the symbol corresponds to a cyclic prefix.

8. The method of claim 1, wherein the first signal portion corresponds to a first sub-band within a bandwidth of the positioning reference signal and the second signal portion corresponds to a second sub-band within the bandwidth of the positioning reference signal.

9. The method of claim 1, wherein the first signal portion corresponds to a first beam from a plurality of beams associated with a transmission-reception point (TRP) and the second signal portion corresponds to a second beam from the plurality of beams associated with the TRP.

10. The method of claim 1, further comprising:
receiving at least one signal measurement associated with an unauthorized signal transmitted using one or more resources corresponding to the second signal portion.

11. The method of claim 10, further comprising:
identifying a transmission-reception point (TRP) associated with the positioning attack based on the at least one signal measurement.

12. The method of claim 10, further comprising:
identifying one or more UE devices that are outside a range of the unauthorized signal; and configuring the one or more UE devices to ignore the positioning reference signal.

13. The method of claim 1, wherein a plurality of user equipment (UE) devices are configured to process the first signal portion and the second signal portion.

14. An apparatus for detecting a positioning attack, the apparatus comprising:
at least one transceiver;
at least one memory; and
at least one processor coupled to the at least one transceiver and the at least one memory and configured to:
determine a positioning reference signal having at least a first signal portion and at least a second signal portion;
obtain an indication of a positioning attack associated with the positioning reference signal; and
provide, to a base station, a message of transmission preemption of the second signal portion of the positioning reference signal based on the indication of the positioning attack, wherein the message of transmission preemption provides an indication to the base station to inhibit transmission of the second signal portion of the positioning reference signal periodically or on a pseudo-random basis.

15. The apparatus of claim 14, wherein to obtain the indication of the positioning attack the at least one processor is further configured to:
determine a metric associated with the positioning attack.

16. The apparatus of claim 15, wherein the metric associated with the positioning attack is based on a plurality of position measurements provided by a plurality of UE devices.

17. The apparatus of claim 15, wherein the message of transmission preemption of the second signal portion is provided in response to a determination that the metric associated with the positioning attack is greater than a threshold value.

18. The apparatus of claim 14, wherein the first signal portion corresponds to a first portion of a slot and the second signal portion corresponds to a second portion of the slot.

19. The apparatus of claim 14, wherein the first signal portion corresponds to a first portion of a symbol and the second signal portion corresponds to a second portion of the symbol.

20. The apparatus of claim 19, wherein the first portion of the symbol corresponds to a cyclic prefix.

21. The apparatus of claim 14, wherein the first signal portion corresponds to a first sub-band within a bandwidth of the positioning reference signal and the second signal portion corresponds to a second sub-band within the bandwidth of the positioning reference signal.

22. The apparatus of claim 14, wherein the first signal portion corresponds to a first beam from a plurality of beams associated with a transmission-reception point (TRP) and the second signal portion corresponds to a second beam from the plurality of beams associated with the TRP.

23. The apparatus of claim 14, wherein the at least one processor is further configured to:
receive at least one signal measurement associated with an unauthorized signal transmitted using one or more resources corresponding to the second signal portion.

24. The apparatus of claim 23, wherein the at least one processor is further configured to:
identify a transmission-reception point (TRP) associated with the positioning attack based on the at least one signal measurement.

25. The apparatus of claim 23, wherein the at least one processor is further configured to:

identify one or more UE devices that are outside a range of the unauthorized signal; and configure the one or more UE devices to ignore the positioning reference signal.

26. The apparatus of claim 14, wherein a plurality of user equipment (UE) devices are configured to process the first signal portion and the second signal portion.

27. A non-transitory computer-readable storage medium comprising at least one instruction for causing a computer or processor to:

determine a positioning reference signal having at least a first signal portion and at least a second signal portion;

obtain an indication of a positioning attack associated with the positioning reference signal; and provide a message of transmission preemption of the second signal portion of the positioning reference signal based on the indication of the positioning attack, wherein the message of transmission preemption provides an indication to the base station to inhibit transmission of the second signal portion of the positioning reference signal periodically or on a pseudo-random basis.

28. The non-transitory computer-readable storage medium of claim 27, wherein the message of transmission preemption of the second signal portion is provided in response to a determination that a metric associated with the positioning attack is greater than a threshold value.

29. An apparatus for detecting a positioning attack, the apparatus comprising:

means for determining, by a location server, a positioning reference signal having at least a first signal portion and at least a second signal portion;

means for obtaining an indication of a positioning attack associated with the positioning reference signal; and means for providing a message of transmission preemption of the second signal portion of the positioning reference signal based on the indication of the positioning attack, wherein the message of transmission preemption provides an indication to the base station to inhibit transmission of the second signal portion of the positioning reference signal periodically or on a pseudo-random basis.

30. The apparatus of claim 29, wherein providing the message of transmission preemption of the second signal portion of the positioning reference signal is in response to determining that a metric associated with the positioning attack is greater than a threshold value.

* * * * *